US012735071B2

(12) United States Patent
Pronovost

(10) Patent No.: US 12,735,071 B2
(45) Date of Patent: Sep. 15, 2026

(54) PREDICTIVE MODELS FOR AUTONOMOUS VEHICLES BASED ON OBJECT INTERACTIONS

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 314 days.

(21) Appl. No.: 18/087,581

(22) Filed: Dec. 22, 2022

(65) Prior Publication Data

US 2024/0208546 A1 Jun. 27, 2024

(51) Int. Cl.
*B60W 60/00* (2020.01)
*B60W 30/08* (2012.01)
(Continued)

(52) U.S. Cl.
CPC ........ *B60W 60/0027* (2020.02); *B60W 30/08* (2013.01); *B60W 30/095* (2013.01);
(Continued)

(58) Field of Classification Search
CPC ............. B60W 60/0027; B60W 30/08; B60W 30/095; G06T 7/73; G06V 20/56; G06V 20/58
See application file for complete search history.

(56) References Cited

U.S. PATENT DOCUMENTS 11,858,536 B1 * 1/2024 Liu ...................... G06N 3/0464
11,975,726 B1 * 5/2024 Gu ......................... G06N 3/044
(Continued)

FOREIGN PATENT DOCUMENTS

CN 111950647 A * 11/2020 ........... G06K 9/6256
CN 112651374 A * 4/2021 ........... G01S 13/931
(Continued)

OTHER PUBLICATIONS

Joint Interaction and Trajectory Prediction for Autonomous Driving using Graph Neural Networks (Year: 2019).*
(Continued)

*Primary Examiner* — Ramon A. Mercado
*Assistant Examiner* — Tyler Roger Robarge
(74) *Attorney, Agent, or Firm* — Lee & Hayes, P.C.

(57) ABSTRACT

Techniques are discussed herein for training and executing machine learning (ML) prediction models used to control autonomous vehicles in driving environments. In various examples, ML prediction models configured to output joint trajectory predictions for multiple objects in an environment may be trained by evaluating the interactions between the objects represented by the predicted trajectories. A training component may train an ML prediction model using a standard loss function based on the accuracy of the predicted trajectories relative to the ground truth trajectories, and based on an auxiliary loss determined by the agent-to-agent interactions represented by the predicted trajectories. The auxiliary loss may be determined by various techniques, including using a classification model trained to receive and classify sets of object trajectories in a generative adversarial network (GAN), and/or determining a divergence loss based on an alternative ML prediction model that masks object interactions, thereby increasing reliance on object interactions in the training of the ML prediction model.

20 Claims, 10 Drawing Sheets

(51) Int. Cl.

| | |
|---|---|
| ***B60W 30/095*** | (2012.01) |
| ***G06T 7/73*** | (2017.01) |
| ***G06V 20/56*** | (2022.01) |
| ***G06V 20/58*** | (2022.01) |

(52) U.S. Cl.
CPC ................ *B60W 60/00* (2020.02); *G06T 7/73* (2017.01); *G06V 20/56* (2022.01); *G06V 20/58* (2022.01)

(56) References Cited

U.S. PATENT DOCUMENTS

| | | | | |
|---|---|---|---|---|
| 2020/0159225 | A1* | 5/2020 | Zeng | G05D 1/0088 |
| 2021/0056402 | A1* | 2/2021 | McGill | G06N 3/08 |
| 2021/0110273 | A1* | 4/2021 | Kwon | G06N 3/045 |
| 2021/0150228 | A1* | 5/2021 | Goforth | G06T 7/73 |
| 2021/0271252 | A1* | 9/2021 | Zhao | G06F 18/251 |
| 2021/0276587 | A1* | 9/2021 | Urtasun | G06F 11/3013 |
| 2021/0402991 | A1* | 12/2021 | Gautam | G06N 3/049 |
| 2022/0092456 | A1* | 3/2022 | Piot | G06N 3/0464 |
| 2022/0169244 | A1* | 6/2022 | Sun | B60W 50/0097 |
| 2023/0021034 | A1* | 1/2023 | Cui | G06N 3/088 |
| 2023/0037632 | A1* | 2/2023 | Liu | G06N 3/006 |
| 2023/0058341 | A1* | 2/2023 | Lee | G06N 3/09 |
| 2023/0136303 | A1* | 5/2023 | Zheng | G06N 3/006 706/15 |
| 2023/0153388 | A1* | 5/2023 | Barbieri | G06N 3/045 706/45 |
| 2024/0132112 | A1* | 4/2024 | Afshar | G01C 21/32 |
| 2024/0176989 | A1* | 5/2024 | Lyu | G06N 3/0455 |
| 2024/0220776 | A1* | 7/2024 | Kingetsu | G06N 3/082 |

FOREIGN PATENT DOCUMENTS

| | | | | | |
|---|---|---|---|---|---|
| CN | 113362367 | A | * | 9/2021 | G06N 3/045 |
| CN | 114913197 | | | 8/2022 | |
| CN | 115168720 | A | * | 10/2022 | G06F 16/9535 |
| WO | WO-2022103737 | A1 | * | 5/2022 | B60W 30/0956 |
| WO | WO-2023011694 | A1 | * | 2/2023 | G06N 3/0499 |
| WO | WO-2023033282 | A1 | * | 3/2023 | G06N 3/04 |
| WO | WO-2023242223 | A1 | * | 12/2023 | |

OTHER PUBLICATIONS

Causal-based Time Series Domain Generalization for Vehicle Intention Prediction (Year: 2022).*

Deep Object Detection With Example Attribute Based Prediction Modulation (Year: 2022).*

W. Kurt, “Count Bayesie,” Count Bayesie, May 10, 2017. https://www.countbayesie.com/blog/2017/5/9/kullback-leibler-divergence-explained (Year: 2017).*

Wong, Kelvin, et al. “Testing the safety of self-driving vehicles by simulating perception and prediction.” Computer Vision—ECCV 2020: 16th European Conference, Glasgow, UK, Aug. 23-28, 2020, Proceedings, Part XXVI 16. Springer International Publishing, 2020. (Year: 2020).*

The PCT Search Report and Written Opinion mailed May 1, 2024 for PCT Application No. PCT US2023/0285159, 11 pages.

* cited by examiner

PREDICTIVE MODELS FOR AUTONOMOUS VEHICLES BASED ON OBJECT INTERACTIONS

BACKGROUND

Autonomous vehicles may include various software-based systems, hardware-based systems, and/or controllers to guide the vehicle through an environment. For example, a controller of an autonomous vehicle can use sensor systems, object perception and prediction systems, and route planning and optimization techniques to plan routes, determine drive paths, and guide the vehicle through environments containing static and dynamic objects. In order to ensure safety for passengers as well as surrounding persons and objects, while traversing through congested areas with other moving vehicles (autonomous or otherwise), moving people, stationary buildings, etc., the autonomous vehicle may receive and analyze data to make decisions. For instance, while traversing an environment, the autonomous vehicle may use a combination of sensor data from various sensors about the objects in the surrounding environment, as well as map data representing the surrounding environment, to analyze the environment and determine how to control and navigate the vehicle in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
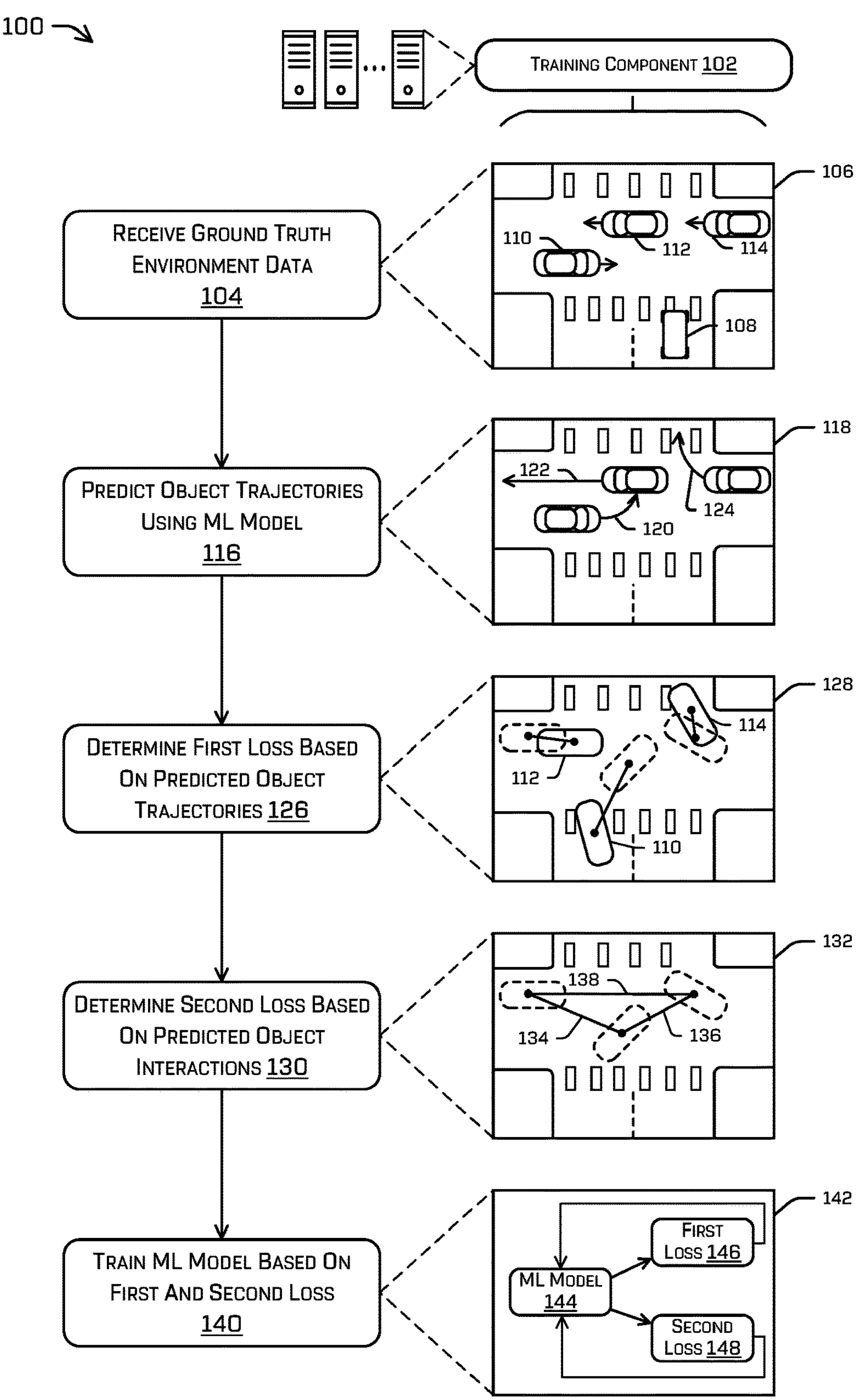
FIG. 1 illustrates an example technique of training a machine learning (ML) model configured to predict movements of objects in an environment, in accordance with one or more examples of the disclosure.

This application relates to training and executing machine learning (ML) models used to control the movement and/or navigation of autonomous vehicles within driving environments. In particular, this application relates to training and executing ML prediction models configured to output joint trajectory predictions for multiple dynamic objects (or agents) in an environment, by evaluating not only the accuracy of the trajectory predictions but also the agent-to-agent interactions represented by the trajectories. As described in various examples herein, a training component may train an ML trajectory prediction model (or prediction model) using a standard loss function (e.g., an L2 loss function) based on the accuracy of the predicted trajectories relative to the corresponding ground truth trajectory data. In addition to using the standard loss function, the training component may determine an additional (or auxiliary) loss based on interaction data associated with the predicted agent-to-agent interactions within the predicted trajectories. Various techniques are described herein for using the interaction data to determine auxiliary loss values that can be used to train the prediction model to output sets of agent trajectories that reflect more realistic agent-to-agent interactions. In some examples, the interaction data and/or auxiliary losses may be determined using a classification model trained to receive and classify sets of object trajectories in a generative adversarial network (GAN). In such examples, the classification model may receive as inputs sets of trajectories, and may classify the sets of trajectories either as observed trajectories (e.g., ground truth trajectories) or generated trajectories (e.g., trajectories output by the predictive model). The output of the classification model may include interaction data indicating whether the input trajectories are classified as observed or generated trajectories. The auxiliary loss may be determined based on the accuracy of the classification, and one or both of the classification model or the predictive model may be trained using the auxiliary loss. In other examples, the auxiliary loss may be determined as a divergence loss based on interaction data representing the difference between the output of the predictive model and a second predictive model configured to mask out agent interactions. In such examples, the auxiliary loss may be used to train the predictive model to increase its reliance on the agent-to-agent interactions within the trajectories.

In some examples, the techniques discussed herein may be implemented in the context of a vehicle, such as an autonomous vehicle. When an autonomous vehicle is operating in an environment, the vehicle may use sensors to capture sensor data (e.g., image or video data, radar data, lidar data, sonar data, etc.) of the surrounding environment, and may analyze the sensor data to detect and classify objects within the environment. Objects encountered by the autonomous vehicle may include other dynamic objects (which also may be referred to as agents) that are capable of movement (e.g., vehicles, motorcycles, bicycles, pedestrians, animals, etc.), and/or static objects such as buildings, road surfaces, trees, signs, barriers, parked vehicles, etc. In order to safely traverse the environment, the autonomous vehicle may include components configured to analyze the attributes of the detected objects and predict trajectories for objects. For example, perception and/or prediction components of an autonomous vehicle may execute trained models or other subcomponents configured to detect and classify objects based on the sensor data (e.g., segmentation, classification, tracking, etc.), and to analyze the movement of objects to predict future routes and/or trajectories, etc. For instance, perception and/or prediction components may analyze various modalities of sensor data to classify objects into object types (e.g., cars, trucks, motorcycles, pedestrians, cyclists, animals, buildings, trees, etc.), and may determine object features or attributes, and may predict future object behaviors and states (e.g., potential trajectories, locations, poses, etc.) based on the output of the trained prediction models.

To traverse an environment safely and efficiently, it may be important for an autonomous vehicle to make accurate predictions of the future locations and states of the other dynamic objects in the environment. However, predicting the trajectories of dynamic objects in real-world driving environments can be technically challenging and computationally expensive. For example, an autonomous vehicle may predict a future trajectory for an object based on a current or previous trajectory of the object, the existing velocity vector of the object, and/or the map data associated with the environment. However, dynamic objects may change their trajectories frequently and unpredictably, requiring the autonomous vehicle to update the predicted object trajectories and determine corresponding updated driving maneuvers on the fly for the autonomous vehicle to perform.

Autonomous vehicles may use various ML prediction models to make future state predictions (e.g., predicted locations, predicted trajectories, poses, and/or other state data) for the dynamic objects in the environment. In some cases, a prediction component of an autonomous vehicle may execute one or more ML prediction models configured to output predicted state data based on a current representation of the environment, including the map data at the current location, the current states of the proximate agents and other objects in the environment, and the current state and planned route of the autonomous vehicle traversing the environment. Various ML prediction models may be trained using training data, which may include log data previously captured by similar vehicles traversing similar environments.

When ML prediction models are sufficiently trained with ground truth data from driving environments (e.g., previous vehicle log data), the prediction models may provide accurate predictions of the future trajectories of individual agents in the environment. However, for ML prediction models configured to jointly predict the trajectories of multiple agents in an environment, the prediction models may predict a set of trajectories that are individually accurate but do not represent accurate (e.g., realistic) interactions between the agents. As an example, a trained prediction model may be used to jointly predict trajectories for three different agents (e.g., other vehicles) operating near an autonomous. In this example, the prediction model may output three predicted trajectories (e.g., one for each agent), each of which may be accurate with respect to the corresponding agent when considered in isolation. However, when the three predicted trajectories are analyzed collectively, they may represent interactions between the three agents that are unlikely or unrealistic.

To address the challenges of determining joint trajectories for multiple agents in an environment, some systems apply sets of heuristics to verify that the different predicted trajectories are compatible with one another. For instance, a heuristic may be used to verify that the predicted trajectories do not overlap with each other at a future time point. However, while such heuristics may be sufficient to determine that the predicted trajectories would not result in a collision, these heuristics may fail to distinguish between realistic and unrealistic agent interactions in complex driving situations. For instance, for driving situations such as merging, yielding or taking the right-of-way, following other agents in traffic-dense locations, performing maneuvers at crosswalks or T-junctions, managing vehicle-bicycle interactions or vehicle-bicycle interactions, and the like, predictive models trained using standard techniques may fail to predict trajectories that represent realistic agent-to-agent interactions.

The techniques described herein address these technical challenges and provide improvements to systems that use trained ML prediction models, by training prediction models based on a combination of standard training techniques (e.g., loss functions based on trajectory accuracy relative to ground truth trajectories) along with additional (or auxiliary) losses based on the evaluation of the interaction data (e.g., of agent-to-agent interactions) represented by the predicted trajectories. As noted above, a training component may implement any number of techniques, individually or in various combinations, to determine the auxiliary loss to be used for training the prediction model based on the interaction data. By training the prediction model using a combination of a standard loss function (e.g., an L2 loss function) representing the accuracy of the predicted trajectories relative to ground truth trajectories, and the auxiliary loss representing the accuracy (e.g., in terms of realistic behaviors) of the agent-to-agent interactions of the predicted trajectories, the trained prediction model may output improved joint trajectory predictions of highly-accurate trajectories that also reflect more realistic agent-to-agent interactions.

In some examples, the training component may determine the auxiliary loss using a generative adversarial network (GAN) including a classification model trained to classify sets of multiple agent trajectories. For instance, the training component may include a binary classification model configured to receive as input sets of multiple associated agent trajectories in an environment. A set of input trajectories provided to the classification model can be a "real" set of observed trajectories determined from the ground truth data, or an artificial set of predicted trajectories generated by the prediction model. For each input provided, the classification model may be configured to output a binary determination indicating either that the input set of trajectories is real (e.g., from ground truth data) or artificially generated (e.g., output by the prediction model).

Using the outputs of the classification model, the training component may alternatively train the classification model and/or the prediction model in a GAN system. For example, when the classification model correctly identifies the source of an input set of trajectories (e.g., as ground truth or as output from the prediction model), the training component may determine a loss value to apply to the prediction model. In contrast, when the classification model incorrectly identifies the source of the input trajectories, the training component may determine and apply a loss value to the classification model. Using this training pattern within a GAN system, the classification model can be trained specifically to recognize real agent interaction patterns (e.g., ground truth trajectories) and distinguish those patterns from artificially generated agent interaction patterns (e.g., predicted agent trajectories output by the prediction model). Simultaneously, the GAN system trains the prediction model to output sets of predicted agent trajectories that reflect more realistic agent interactions, increasingly similar to the agent interaction patterns of the ground truth trajectories.

In other examples, the training component may determine the auxiliary loss based on the divergence between two similar prediction models. In these examples, the training component may include the primary prediction model being trained and a second similar (or identical) prediction model that does not account for interactions between multiple agents in the environment. In some cases, the second prediction model may be executed as an individual (or non-joint) prediction model configured to predict each agent trajectory independently without considering any other agents in the environment. Additionally or alternatively, the inputs to the second prediction model may be modified to mask out the relative positions of the other agents in the environment (e.g., by modifying or removing the edges of a graph neural network (GNN) representing the environment). The training component then may execute the primary prediction model and the second prediction model using the same input (e.g., the same driving environment representation) and may compare the different sets of predicted trajectories output by the different models. When the sets of predicted trajectories output by the primary and second prediction models are the same (or sufficiently similar), the training component may determine and apply a divergence loss to the primary prediction model. In contrast, when the predicted trajectories output by the primary and second prediction models are sufficiently different, the divergence loss may not be applied to primary prediction model. By selectively applying the divergence loss to the primary prediction model in these cases, the training component can train the model to be more responsive to the interactions between agents in the environment.

As illustrated by various examples, the techniques described herein can improve the functioning of computing devices in a number of ways. For instance, these techniques may improve the performance of trained ML prediction models, providing more accurate predictions of future agent trajectories (and thus more accurate predictions of the future driving scene), especially in situations when multiple agents may interact with one another in the driving environment. By providing improved predictions of the future trajectories and/or states of the agents (e.g., locations, trajectories, poses, etc.), the vehicle may determine driving maneuvers earlier and with greater accuracy, which may improve safety outcomes and driving efficiency. These and other improvements to the functioning of computing devices are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, the techniques described herein may be utilized in driver-controlled vehicles in which such a system may provide an indication to a driver of the vehicle of whether it is safe to perform various maneuvers. In another example, the techniques can be utilized in an aviation or nautical context, or in any system involving objects or entities that may be associated with behavior that is unknown to the system. Additionally, the training techniques described herein can be used with real data (e.g., captured using sensor(s) as ground truth data), simulated data (e.g., ground truth data generated by a simulator), or any combination of the two.

FIG. 1 depicts an example process 100 of training an ML trajectory prediction model to predict future trajectories of various agents in a driving environment (e.g., vehicles, bicycles, pedestrians, etc.), based on ground truth environment data. In various implementations, some or all of the operations in process 100 may be performed by machine learning systems configured to train and execute ML models, such as a training component 102 described in more detail below.

At operation 104, an ML model training component, such as training component 102, may receive ground truth data representing a driving environment including one or more agents (or dynamic objects). In some examples, the ground truth data received in operation 104 may include log data captured or collected by autonomous or non-autonomous (e.g., human-driven) vehicles operating in real-world physical environments, and/or log data from simulated autonomous vehicles operating in simulated driving environments. In such cases, since the log data may comprise sequences including various vehicle states and/or object states over a period of time, the ground truth data may comprise the state of the vehicle that captured the log data and the states of any number of additional objects (e.g., agents and/or static objects) at each subsequent timestep from an input time.

The driving scene shown in box 106 depicts an example scene in which a particular vehicle (e.g., vehicle 108) captures and/or determines the set of ground truth environment data as log data over a period of time as the vehicle 108 traverses the driving environment. The log data captured by the vehicle 108 may represent various states of the vehicle 108 itself, and any other objects in the proximate driving environment. Although the driving scene shown in box 106 depicts the environment at a single point in time, the ground truth environment data received in operation 104 can include data representing the driving scene over a period of time (e.g., 5 seconds, 10 seconds, 15 seconds, etc.), and may include the positions, movements, and/or other states for the various objects in the driving scene at each timestep in a sequence of timesteps. For instance, the ground truth data may include, for each timestep, the complete state of the vehicle 108 (e.g., including observable attributes and/or internal state data), and the perceived states of the other agents in the environment (e.g., vehicle 110, vehicle 112, vehicle 114, and/or any other vehicles, pedestrians, bicycles, animals, etc.). Additionally, the ground truth data may include various attributes of the driving scene itself (e.g., map data and road network data, weather conditions, lighting conditions, road conditions, etc.).

In various examples, the ground truth data received in operation 104 may include any number of observed or perceived characteristics of the environment itself, and/or of the objects detected in the proximity of the vehicle 108. For instance, for the vehicle 110, the vehicle 112, and/or the vehicle 114 (and/or other objects in the environment), the vehicle 108 may detect and/or determine the object's classification, size, shape, position, location, trajectory, velocity, acceleration, jerk, and the like, at periodic time intervals (e.g., every 0.1 seconds, every 0.05 seconds, every second, etc.) during the driving scene. In some examples, the ground truth data also may include object types of the vehicles 110-114 and/or other perceived objects in the driving scene.

An object type may include an object class (e.g., four-wheeled object (e.g., car, truck, etc.), two-wheeled object (e.g., bicycle, etc.), pedestrian, etc.) and/or an object sub-class (e.g., sedan, bus, petty cab, streetcar, electric bicycle, articulated vehicle, train, etc.).

The ground truth data received in operation 104 also may include the trajectory of the vehicle 108 and the perceived trajectories of any of the additional agents over a period of time during the driving scene, including the observed trajectories for the vehicles 110-114 and/or the trajectories of other objects in the environment (e.g., other vehicles, pedestrians, bicycles, etc.). As used in these examples, a "state" or "vehicle state" may include geometric state data (e.g., position, pose, heading, yaw, steering angle, etc.) as well as movement data for a vehicle or other agent (e.g., velocity, acceleration, yaw rate, steering angle rate, etc.). A "trajectory" may refer to a sequence of states through which the agent may traverse from a start state to an end state. For example, a trajectory may be defined as a sequence of spatiotemporal states, in which each state is specified by any combination of an x-position, a y-position, a yaw, a yaw rate, a steering angle, a steering angle rate, a velocity, and/or an acceleration, etc. Additionally or alternatively, trajectories may include steering angles, velocities, and/or accelerations for each state that the agent can take to traverse from a start state to an end state (or target state). Within the ground truth data, an agent trajectory may be stored as a sequential listing of trajectory points, where each trajectory point is associated with a particular timestamp in the ground truth data (e.g. log data). In some examples, each point in an agent trajectory (e.g., trajectories for vehicles 110-114) may store the x-position of the agent at a particular point in time, the y-position of the agent at the point in time, the yaw of the agent at the point in time, the velocity of the agent at the point in time, the steering angle of the agent at the point in time, etc. In other examples, any number of additional or alternative vehicle state data may be stored in trajectories, such as acceleration data, orientation/pose data, operating control data (e.g., turn signals, lights, etc.), and/or operational status data perceived by the vehicle 108. In at least one example, the ground truth data also may include agent locations, positions, and/or orientations of the vehicles 110-114 and/or other objects, at each periodic timestep and/or at each time interval. Additionally, the ground truth data also may include data identifying events observed by the vehicle 108 associated with the additional agents in the environment, such as collisions or near-miss collisions, traffic violations, crossing or jaywalking pedestrians, cyclists, or animals, weather anomalies, construction zones, detours, school zones, and the like. Such events may be associated with one or more of the agents/objects, and the events and/or behaviors may be designated from a list of events and/or agent behaviors.

At operation 116, the training component 102 may use an ML prediction model to predict trajectories for one or more agents in the driving environment represented by the ground truth data. For example, as shown in box 118, the training component 102 may use an ML prediction model to predict a first trajectory 120 for the vehicle 110, a second trajectory 122 for the vehicle 112, and a third trajectory 124 for the vehicle 114. The ML model used to predict the agent trajectories 120-124 may be configured to jointly predict the trajectories for the agents in the environment, so that the predicted trajectories output by the model are compatible (e.g., do not overlap and/or would not result in a potential collision or near-miss collision between the vehicles 110-114).

As noted above, the operations of FIG. 1 may be performed as part of a training technique (e.g., a training stage/iteration, batch, or epoch) for training the prediction model, based on the ground truth data, to output more accurate and/or realistic sets of agent trajectories. Accordingly, the prediction model used in operation 116 to predict the agent trajectories 120-124 may be an untrained or partially trained model in an intermediate training stage, rather than a fully trained model. The prediction model used in operation 116, which may be trained via the training processes described herein into a trained prediction model, may be configured to output one or more sets of individual and/or joint trajectory predictions for multiple agents in a driving environment. In this example, although box 118 depicts only a single point in time of a single predicted future driving scene, the prediction model may output a set of predicted trajectories corresponding to the predicted positions/states of the vehicles 110-114 at various incremental timesteps over a period of time (e.g., 8 predicted positions/poses determined over 8 seconds, one per second). Additionally, in some cases, the prediction model may output multiple alternative sets of predicted trajectories, representing different possible futures of the driving environment. In such cases, each alternative set of predicted trajectories may be associated with a different confidence value or probability, etc.

The inputs to the prediction model used in these examples (which also may be referred to as trajectory prediction model) may include various data representing the ground truth driving environment depicted at a point in time within the driving scene. For instance, the input data to the prediction model may include the map data associated with the driving scene, the positions and other state data for the vehicles 110-114 (and/or other objects) before and during the driving scene, and the position/state and planned route of the vehicle 108 traversing the environment.

In some examples, the inputs to the prediction model may include a scene embedding based on the ground truth environment data received in operation 104 for the driving scene. For instance, the training component 102 may include functionality to generate a scene embedding representing the driving environment at a specific time in the ground truth data (e.g., vehicle log data) including map data and/or a road network data, perceived road and traffic signal data at the specific time (e.g., traffic light states, road permissibility, etc.), object data for the static and/or dynamic objects in the environment at the specific time, and encoded vehicle state data including the intended destination of the vehicle 108 at the specific time. In such cases, the training component may transform the input data into a scene embedding, which may be represented as a multidimensional vector within a driving scene embedding space, and may provide the scene embedding as an input to the prediction model. Additional techniques and examples for generating scene embeddings to use as input to ML prediction models can be found, for example, in U.S. patent application Ser. No. 17/855,088, filed Jun. 30, 2022, and entitled "Machine-Learned Component Hybrid For Vehicle Trajectory Generation," the contents of which are incorporated herein by reference in their entirety for all purposes. Additionally or alternatively, a scene embedding component within the training component may be configured to receive other types and formats for representations of the driving environment. For instance, a scene embedding neural network may be configured to receive a vectorized representation based on map data and the objects within an environment, as described, for example, in U.S. patent application Ser. No. 17/187,170, filed Feb. 26, 2021, and entitled "Graph Neural Network With Vectorized Object Representations In Autonomous Vehicle Systems," the contents of which are incorporated herein by reference in their entirety for all purposes.

At operation 126, the training component 102 may determine a first loss during the current training stage, based on the accuracy of the predicted agent trajectories 120-124, relative to the actual (e.g., observed) trajectories of the vehicles 110-114 within the ground truth data. As shown in box 128, in some examples, determining the first loss may include determining relative position differences between the predicted agent trajectories 120-124 and the actual ground truth trajectories, individually or collectively, for the set of agents (e.g., vehicles 110-114). In various examples, the training component 102 may determine the first loss value using one or more standard loss functions based on comparisons of the predicted trajectories 120-124 to the corresponding ground truth trajectories. The loss functions may include, for instance, a mean squared error (or L2) loss function, a mean absolute error (or L1) loss function, and/or a mean bias error function based on the position differences between the predicted agent trajectories 120-124 and the actual ground truth trajectories. In some examples, the loss function used to evaluate a predicted agent trajectory against a ground truth trajectory may be weighted so that differences (e.g., loss values) in the earlier trajectory points are weighted more than the differences in the later trajectory points. In addition to (or instead of) using position differences to determine the first loss, in some examples, the training component 102 also may evaluate the first loss of the predicted agent trajectories based at least in part on differences in pose, yaw, velocity, acceleration, steering angle, etc., between the predicted agent trajectories 120-124 and the ground truth trajectories.

Additional techniques and examples of determining losses to trained ML models to predict object trajectories can be found, for example, in U.S. Pat. No. 11,169,531, filed Oct. 4, 2018, and entitled "Trajectory Prediction on Top-Down Scenes," and in U.S. patent application Ser. No. 16/504,147, filed Jul. 5, 2019, and entitled "Prediction on Top-Down Scenes based on Action Data," the entire contents of which are incorporated herein by reference for all purposes. Additional examples and techniques for determining and using losses in trained ML models to perform prediction based on top-down representations of environments can be found, for example, in U.S. patent application Ser. No. 17/232,534, filed Apr. 16, 2021, and entitled, "Boundary Aware Top-Down Trajectory Prediction," the entire contents of which is incorporated herein by reference for all purposes. Further examples and techniques for determining and using losses for training ML models to perform prediction based on graph-based representations of environments can be found, for example, in U.S. patent application Ser. No. 17/535,357, filed Nov. 24, 2021, and entitled, "Encoding Relative Object Information Into Node Edge Features," the entire contents of which is incorporated herein by reference for all purposes.

At operation 130, the training component 102 may determine a second loss during the current training stage. In this example, the second loss may correspond to any combination of the various types of additional (or auxiliary) losses described herein. In particular, the second loss values determined in operation 130 may be based on evaluations of the agent-to-agent interactions represented by the predicted agent trajectories 120-124, in contrast to the first loss which may be based on the accuracy of the predicted trajectories relative to the corresponding ground truth trajectories. In various examples, the training component 102 may analyze the driving paths predicted agent trajectories 120-124 and/or the relative distances between each pair of agents (e.g., vehicles 110-114) within the predicted agent trajectories 120-124. For instance, as shown in box 132, the training component 102 may determine the distance between each pair of agents (e.g., distance 134 between vehicle 110 and vehicle 112, distance 136 between vehicle 110 and vehicle 114, and distance 138 between vehicle 112 and vehicle 114) based on the predicted agent trajectories 120-124, at each time step within the predicted trajectories.

As noted above, unlike the first loss, the second (or auxiliary) loss might not take into account the accuracy of any (or all) of the predicted agent trajectories 120-124 relative to the corresponding ground truth trajectories. Instead, in operation 130, the training component may use any number of techniques, individually or in combination, to evaluate the agent-to-agent interactions that the predicted agent trajectories 120-124 represent. The evaluations may determine the second loss value as an indication of how realistic or unrealistic the agent-to-agent interactions are, based on the agent-to-agent interactions in the ground truth data and/or other various other techniques. Additionally, when the agent interactions between the predicted agent trajectories 120-124 are compared to the ground truth trajectories, they need not be compared to the same corresponding ground truth trajectories for the same driving scene. Rather, the training component 102 may determine similar (or dissimilar) patterns of agent interactions between sets of agent trajectories, even when the sets of agent trajectories correspond to different driving environments or scenes.

Various techniques for determining the second (or auxiliary) loss during a training stage (or iteration) are described below in more detail. Such techniques may include, for example, using a classification model trained to receive and classify sets of agent trajectories in a GAN, and/or determining a divergence loss based on the difference between the output of the predictive model and a different predictive model configured to mask out agent interactions from the input data. Additionally, any of the techniques described herein for determining auxiliary loss based on agent-to-agent interactions may be performed individually or in combination to determine the second loss in operation 130. As described below in more detail, the training component 102 may apply any number of weight values, heuristics, and/or latent variables to the determination of the second loss, and/or to the training of the prediction model based on the second loss.

At operation 140, the training component 102 may continue the training stage by training the prediction model based on a combination of the first loss and the second loss. As shown in box 142, a prediction model 144 may be trained using backpropagation (and/or other model training techniques) based on the first loss indicating the degree of accuracy of the predicted agent trajectories 120-124 relative to the corresponding ground truth trajectories, and the second indicating the degree of to which the predicted agent trajectories 120-124 represent realistic agent-to-agent interactions. As noted above, by training the prediction model 144 using the combination of the first loss and second loss, the prediction model may be trained to output improved joint trajectory predictions that include both highly accurate trajectories as well as trajectories that reflect more realistic agent-to-agent interactions.

In some examples, operation 140 may correspond to a training stage during which the training component 102 may perform backpropagation to modify agent feature vectors, edge features, etc., within the model, based on the accuracy of the predicted agent trajectories 120-124 (e.g., the first loss) and the degree to which the predicted agent trajectories 120-124 represent realistic agent interactions (e.g., the second loss). Depending on the neural network structure of the prediction model, the training in operation 140 also may include modifications to weight values, reconfiguration of nodes and/or layers of a multi-layer neural network, etc., to minimize the loss.

Although the above example describes a training component 102 performing a training stage based on a single set of predicted agent trajectories 120-124 output by the prediction model 144, it can be understood that any number of training stages can be performed based on any amount of ground truth environment data. During the training stages, the training component 102 may use backpropagation repeatedly to adjust the prediction model (e.g., modify the GNN, RNN, CNN, or other neural network structure), so that at the completion of the training process the prediction model 144 is sufficiently or optimally trained to output highly accurate predicted trajectories that also reflect realistic agent interactions.

Figure 2:
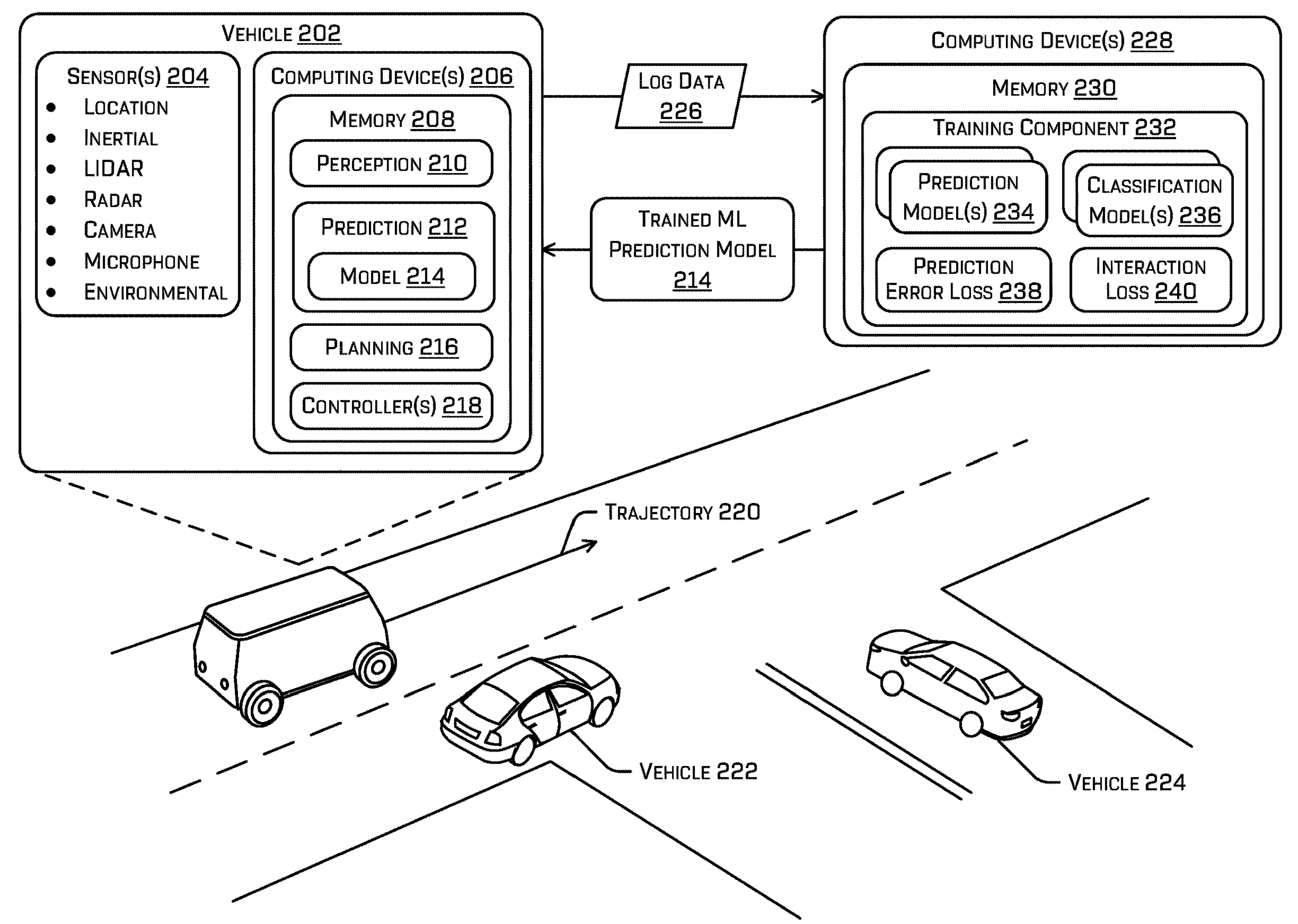
FIG. 2 illustrates an example driving scenario in which an autonomous vehicle is configured with an ML prediction model, in accordance with one or more examples of the disclosure.

FIG. 2 illustrates an example scenario 200 including a vehicle 202. As described above, an ML trajectory prediction model (e.g., ML model 144) trained using the various techniques described herein may be transmitted to a target vehicle and used to control the navigation and/or driving behaviors of the target vehicle. In various examples, a real and/or simulated autonomous target vehicle may execute a trained prediction model to determine predicted trajectories (and/or future predicted states) for one or more other agents in the driving environment.

In some examples, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 202 is depicted as a land vehicle, vehicle 202 may be an aircraft, spacecraft, watercraft, and/or the like. In some examples, vehicle 202 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 202 may receive sensor data from sensor(s) 204 of the vehicle 202. For example, the sensor(s) 204 may include a location sensor (e.g., a global positioning system (GPS) sensor), an inertia sensor (e.g., an accelerometer sensor, a gyroscope sensor), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a thermometer, barometer, a hygrometer, etc.).

The sensor(s) 204 may generate sensor data, which may be received by computing device(s) 206 associated with the vehicle 202. However, in other examples, some or all of the sensor(s) 204 and/or computing device(s) 206 may be separate from and/or disposed remotely from the vehicle 202 and data capture, processing, commands, and/or controls may be communicated to/from the vehicle 202 by one or more remote computing devices via wired and/or wireless networks.

The autonomous vehicle 202 may provide the sensor data received from such sensor(s) 204 to one or more systems of the autonomous vehicle 202 to accomplish a variety of functions of the autonomous vehicle. For example, one or more systems may control a passenger ride experience (e.g., temperature/humidity control, interior display control, door control functionality, seat functionality), a localization and/or mapping system may generate a map of surroundings of the autonomous vehicle and/or a position and/or orientation of the autonomous vehicle 202 within a map, an emitter control component may control exterior emitters (e.g., turn signal(s), headlight(s), taillight(s), speaker(s), microphone(s)), a perception system that may detect and track object(s) in an environment of the autonomous vehicle, a prediction system that may predict future positions, velocities, and/or accelerations of objects in the environment, a planning system that may determine a trajectory for controlling motion of the autonomous vehicle, etc. These systems may, in turn, include one or more subcomponents.

Computing device(s) 206 may comprise a memory 208 storing a perception component 210, a prediction component 212 including a trained prediction ML model (or prediction model) 214, a planning component 216, and/or system controller(s) 218. Although depicted in FIG. 2 for illustrative purposes, it should be understood that ML model 214 may reside in/on a separate computing device (or otherwise) than any one or more of the other components. The perception component 210, the prediction component 212, the planning component 216, and/or the controller(s) 218 may include one or more additional ML models integrated within these components or subcomponents, and/or other computer-executable instructions.

In general, the perception component 210 may include functionality to determine what is in the environment surrounding the vehicle 202, the prediction component 212 may include functionality to generate predicted information associated with objects in an environment, and the planning component 216 may include functionality to determine how to operate the vehicle 202 according to information received from the perception component 210 and the prediction component 212. Multiple sub-components of the perception component 210, prediction component 212, and/or planning component 216 may be used to determine the trajectory 220 for the vehicle 202 to follow based at least in part on the perception data, predicted agent trajectories output by the prediction model 214, and/or other information such as, for example, one or more maps, localization information (e.g., where the vehicle 202 is in the environment relative to a map and/or features detected by the perception component 210), and/or a path generated by a high-level mission planner of the planning component 216.

As noted above, a trajectory may include a spatiotemporal sequence of object states corresponding to different points of time over a short to medium-term time period (e.g., 2 secs, 5 secs, 10 secs, 30 secs, etc.). Each state in a trajectory may include, for example, a position, a pose, a velocity, an acceleration, a yaw, and/or a steering angle. As an example, the trajectory 220 of the vehicle 202 may comprise instructions for controller(s) 218 to actuate drive components of the vehicle 202 to effectuate a steering angle and/or steering rate, which may result in a subsequent state of the trajectory 220 (e.g., a subsequent vehicle position, velocity, acceleration, yaw, yaw rate, steering angle, etc.). In some examples, the trajectory 220 may comprise a target heading, target steering angle, target steering rate, target position, target velocity, and/or target acceleration for the controller(s) 218 to track. In some examples, the controller(s) 218 may comprise software and/or hardware for actuating drive components of the vehicle 202 sufficient to track the trajectory 220.

In some examples, the perception component 210 may comprise a pipeline of hardware and/or software, which may include one or more GPU(s), ML model(s), Kalman filter(s), and/or the like. The perception component 210 may receive sensor data from the sensor(s) 204 and determine data related to objects in the vicinity of the vehicle 202 (e.g., classifications associated with detected objects, instance segmentation(s), semantic segmentation(s), two and/or three-dimensional bounding boxes, tracks), global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 210 may distinguish between different object types such as, for example, a passenger vehicle, a pedestrian, a bicyclist, motorcyclist, a delivery truck, a semi-truck, traffic signage, and/or the like. For example, such a detection may be conducted by an object detection component of the perception component 210, which may comprise one or more ML model(s) and/or ML or other processing software and/or hardware pipeline(s). A track may comprise a historical, current, and/or predicted object position, velocity, acceleration, and/or heading.

In the depicted example, the vehicle 202 may detect vehicle 222 and vehicle 224. The prediction component 212 may comprise one or more object/agent prediction models and/or subcomponents including functionality for handling predictions based on different object types, such as static objects, pedestrians, cyclists, and other vehicles, etc. As shown in this example, the prediction component 212 may use the trained prediction model 214 to predict, based at least in part on the perceived sensor data, map data, the state and driving route of the vehicle 202, predicted trajectories associated with the vehicle 222 and/or vehicle 224. Once the perception component 210 has generated perception data, and the prediction component 212 has determined predicted trajectories for the agents in the environment, the perception component 210 and prediction component 212 may provide this data respectively to the planning component 216.

As discussed above, the prediction model 214 may determine, based at least in part on the initial state of the vehicle 202 and/or the initial driving environment state indicated by at least a portion of the sensor data and/or prediction data, the predicted trajectories of the vehicle 222 and vehicle 224. The predicted trajectories may include, for example, a sequence of future positions, velocities, accelerations, poses, yaws, steering angles, etc., associated with a sequence of future times. The initial driving environment state received by the prediction model 214 may include, for example, may include, the observed and/or predicted positions, velocities, headings, poses, etc., associated with the vehicle 222 and/or the vehicle 224, as well as other data, such as environmental factors, a map or layout of the environment, data associated with dynamic and/or static object(s), etc. The environment state may additionally or alternatively include sensor data. In some examples, any of the data determined by the perception component 210, the prediction component 212, and/or the planning component 216 may be stored as log data 226, which may be transmitted to computing device(s) 228. Log data 226 may include similar or identical data to the ground truth data discussed above, and may include data such as logged positions, velocities, accelerations, poses, etc., of the vehicle 202, additional vehicles 222 and 224, and/or any other objects perceived in the environment.

As discussed above, the planning component 216 may include functionality to determine the trajectory 220 for the vehicle 202 to follow in the environment, based on the current vehicle state, predicted trajectories of vehicles 222 and 224, and other environment data. The planning component 216 may receive as input environment state data (which may include sensor data, perception data, and/or prediction data, for example) indicating a state of the environment at a first time. The planning component 216 may use the environment state data, object states and predicted agent trajectories, and the current vehicle state to determine the output trajectory 220 for the vehicle 202. In some examples, the planning component 216 may include additional ML models and/or other functionality to output an accurate and/or optimal trajectory that reflects the route planning, navigation rules, vehicle capabilities, and/or driving styles associated with the vehicle 202.

The prediction model 214 may be received from one or more computing devices 228 separate from and/or external to the vehicle 202, after the prediction model 214 has been trained. In some examples, the one or more computing devices 228 may execute a training component 232 included in the memory 230 of the one or more computing devices 228. The training component 232 may be similar or identical to training component 102 described herein. The training component 232 may include any number of machine learning components, including but not limited to machine learning algorithms, graphical neural networks (GNNs), convolutional layers, encoding and transformation components, etc. Using these components and the additional machine learning components and techniques described herein, the training component 232 may apply machine learning algorithms to train the prediction model 214 to output accurate and/or optimal predicted agent trajectories as described herein. For example, as described above, the training component 232 may determine and apply an auxiliary loss during training of the prediction model 214, based on agent-to-agent interaction patterns. As described herein, the auxiliary loss may be determined using a number of additional prediction models 234 and/or classification models 236, as well as a combination of loss functions/values determined by a prediction error loss component 238 and an interaction loss component 240.

As shown in this example, after training the ML prediction model 214, the training component 232 may transmit the trained model to the vehicle 202 (and/or any number of additional vehicles or fleets of vehicles). However, the training component 232 need not transmit the additional prediction models 234 and/or classification models 236, which may be used to train the primary ML prediction model 214 but need not be used to perform the trajectory predictions on the vehicle 202. In some cases, the training component 232 may include the functionality to train different prediction models 214 (e.g., using different sets of log data 226 as training data) for different types of vehicles 202 and/or different driving conditions within which the target vehicle is operating (e.g., traffic conditions, road conditions, lighting conditions, weather conditions, etc.).

Figure 3:
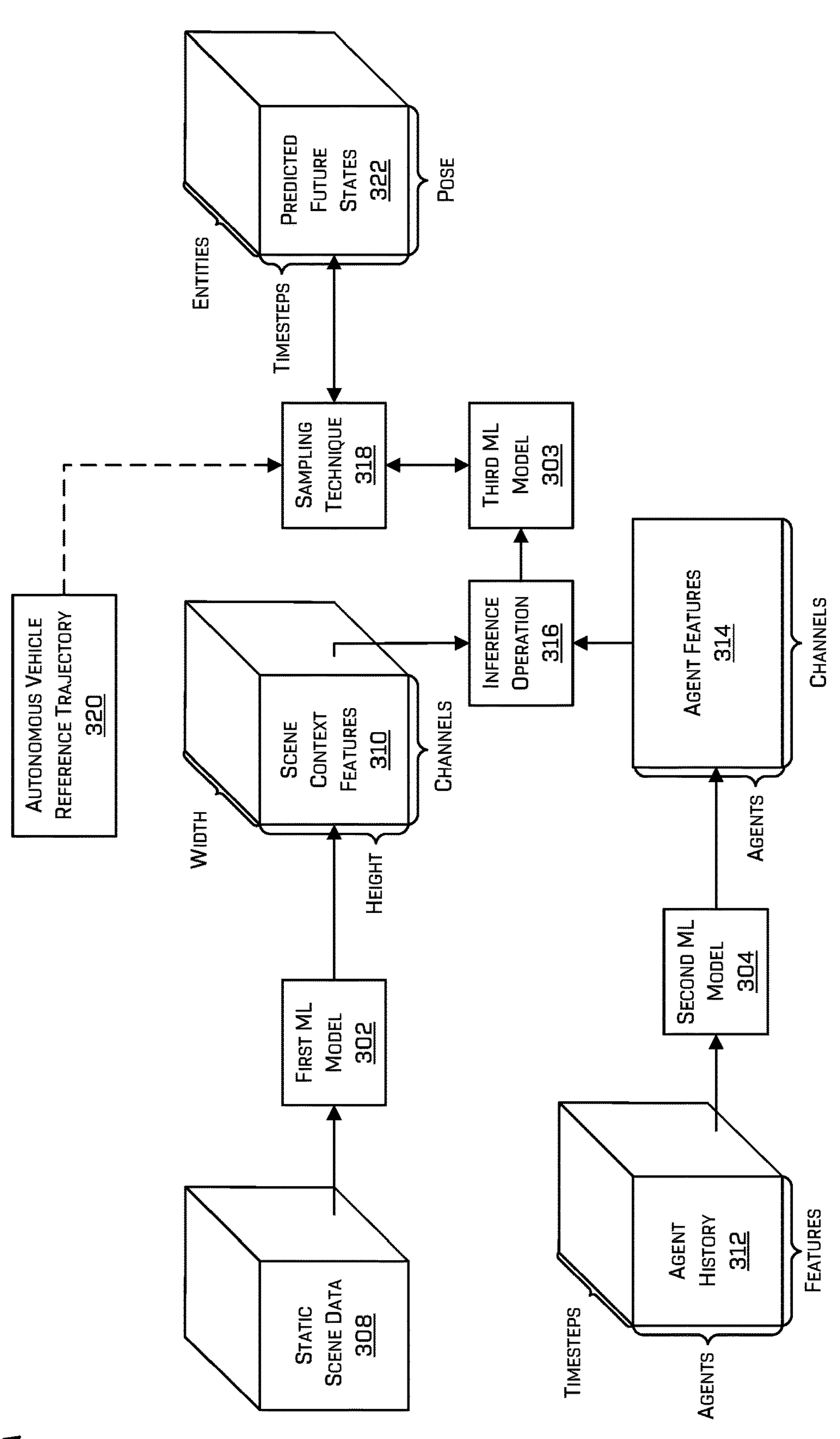
FIG. 3 depicts a block diagram of an example architecture for an ML prediction model, in accordance with one or more examples of the disclosure.

FIG. 3 depicts one example architecture of a machine learning prediction model that may be used in the examples described herein. As discussed above, an autonomous vehicle (e.g., vehicle 202) may use a trained ML prediction model configured to receive input data representing the current state of the driving environment of the vehicle, and configured to output one or more predicted future states of the environment. In various examples, the inputs to a prediction model can include map data associated with the current location of the vehicle in the environment, perception data (and/or sensor data) determined or received by the vehicle representing various objects in the environment (e.g., static objects and/or other agents), and the current state of the autonomous vehicle including its destination and/or planned route for traversing the environment.

In some examples, executing the prediction model may include determining and vectorizing elements of the environment from a feature map associated with the environment, as well as the objects (e.g., agents) perceived in the environment, and representing the vectorized environment elements and objects within a graph structure representation. As shown in this example, the prediction model may use a graph neural network (GNN) including a combination of vehicle nodes and/or object nodes, and including an edge network storing offset data (e.g., relative positions, relative poses, relative speeds, relative accelerations, relative sizes, etc.) between pairs of objects in the GNN. A GNN is a type of neural network which may operate on a graph structure. In various implementations, the GNN may be partially connected or fully connected with separate edge features associated with distinct pairs of nodes in the GNN. Machine-learning-based inference operations, such as, for example, graph message passing, may be performed to update the state of the GNN, including updating nodes and/or edge features, based on internal inputs determined from the GNN itself and/or based on updated observations perceived by the autonomous vehicle in the environment. In these examples, the outputs of the GNN may represent a distribution of predicted future states of the various objects (e.g., agents) in the environment, which may be decoded and/or sampled from by the autonomous vehicle to determine the predicted future agent positions, velocities, trajectories, and/or other updated predicted states for the various objects in the environment.

As shown in this example, the architecture 300 representing a trajectory prediction model may include a first ML model 302, a second ML model 304, and/or a third ML model 306. In this example, the first ML model 302 may be configured as an RNN, the second ML model 304 may be configured as a recurrent neural network (RNN) and/or as a convolution neural network (CNN), and the third ML model 306 may be configured as a GNN. In this example, the first ML model 302 may be configured to process the static scene data 308 associated with the driving environment. In some examples, the static scene data 308 may be determined based on sensor data captured by a vehicle in the environment. Additionally, or alternatively, while not depicted in FIG. 3, the static scene data 308 may be represented in a plan view, an elevation view, or a side view. The first ML model 302 may be configured to process the static scene data 308 to determine scene context features 310 associated with the environment. The scene context features 310 may include any number of channels corresponding to the features of the environment at the current timestep, where each channel may represent a feature (or a feature vector) at a position of the environment corresponding to a width and/or a height of the environment, capturing three-dimensional features of the environment represented by the sensor data.

In this example, the second ML model 304 may be configured to process an agent history 312 associated with the environment. In some examples, the agent history 312 may be based on previous iterations of the GNN and may include the features associated with each agent (and/or other objects) in the environment at each of the previous timesteps. The second ML model 304 may be configured to process the agent history 312 to determine agent features 314 for each agent (and/or other object) at the current timestep. The agent features 314 may include a number of channels corresponding to the features of each agent in the environment at the current timestep.

Once the scene context features 310 and the agent features 314 have been determined for the current timestep, an inference operation 316 may be performed. In some examples, the inference operation 316 may include updating the nodes of the third ML model 306 (e.g., the GNN) based on the agent features 314 and the scene context features 310 at the given timestep. As a result of the inference operation 316, the third ML model 306 may output a distribution of predicted positions for each of the agents in the environment.

In some examples, a sampling technique 318 may be employed to sample a single predicted position from each of the distribution of predicted positions of the agents. The sampling technique 318 may include various sampling techniques, and a different sampling technique 318 may be used to sample from the distribution of predicted positions for an agent between separate timesteps and/or to sample from the different distributions of predicted positions for the agents at the same timestep. In some examples, the sampling technique 318 may be configured as a Gaussian sampling technique (e.g., following a sampling pattern based on a gaussian distribution), a most likely sampling technique (e.g., taking an average, such as the min, max, or mean of the distribution), or an overwrite sampling technique (e.g., selecting a specific position for an object that may or may not be included in the distribution). Additionally, or alternatively, the sampling technique 318 for sampling a predicted position distribution may be determined based on a classification type of a graph node (e.g., is the graph node associated with an autonomous vehicle, an object, a specific type of object, etc.), the predicted positions of the predicted position distribution (e.g., whether the predicted positions are in a predefined area), a distribution type of the predicted position distribution, an input associated with the predicted position distribution (e.g., an autonomous vehicle reference trajectory 320), or the like.

Once a number of predicted positions have been determined for each agent corresponding to a number of timesteps (e.g., 8 predicted positions for each agent corresponding to a sequence of 8 timesteps, each timestep representing 1 second), the predicted future states 322 for the environment may be determined. In some examples, the predicted futures states 322 may include a pose of each agent in the environment across each of the timesteps. In some examples, the predicted future states 322 may be utilized to determine predicted trajectories of the entities, such as, for example, the predicted future states described below with respect to FIG. 4B.

Although the prediction model shown in FIG. 3 may be implemented using a GNN, in other examples prediction models may be implemented without using a GNN and/or using other combinations of neural networks, such as RNNs and/or CNNs. In some examples, a prediction model may be implemented as a long short-term memory (LSTM) network configured to receive driving environment data, such as a top-down multichannel representation of the environment, or a vector-based representation of the environment, etc., along with vehicle state data and/or agent state data. In some examples, the various input data may be encoded before being provided to the LSTM, and the LSTM may be trained to output a number of action heads (e.g., predictions) associated with the agents in the driving environment (e.g., a steering angle head, a velocity head, etc.). An LSTM used to implement a prediction model may include any number of nodes/layers implemented to perform common shared learning, after which individual neural network layers may be implemented to determine the individual outputs/heads.

Figure 4A:
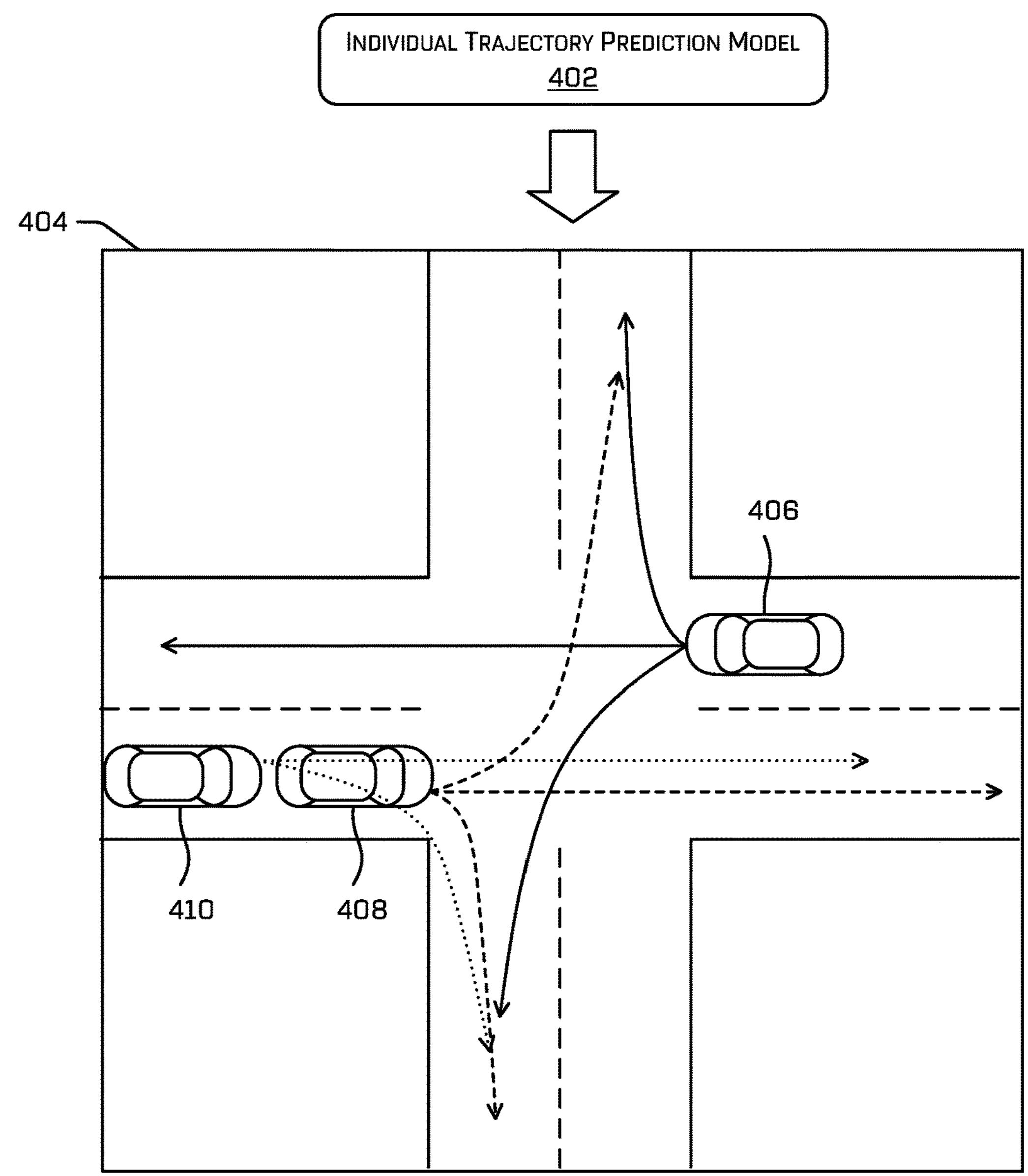
FIG. 4A depicts an example environment including a set of predicted trajectories for object in the environment determined using an individual ML trajectory prediction model, in accordance with one or more examples of the disclosure.
Figure 4B:
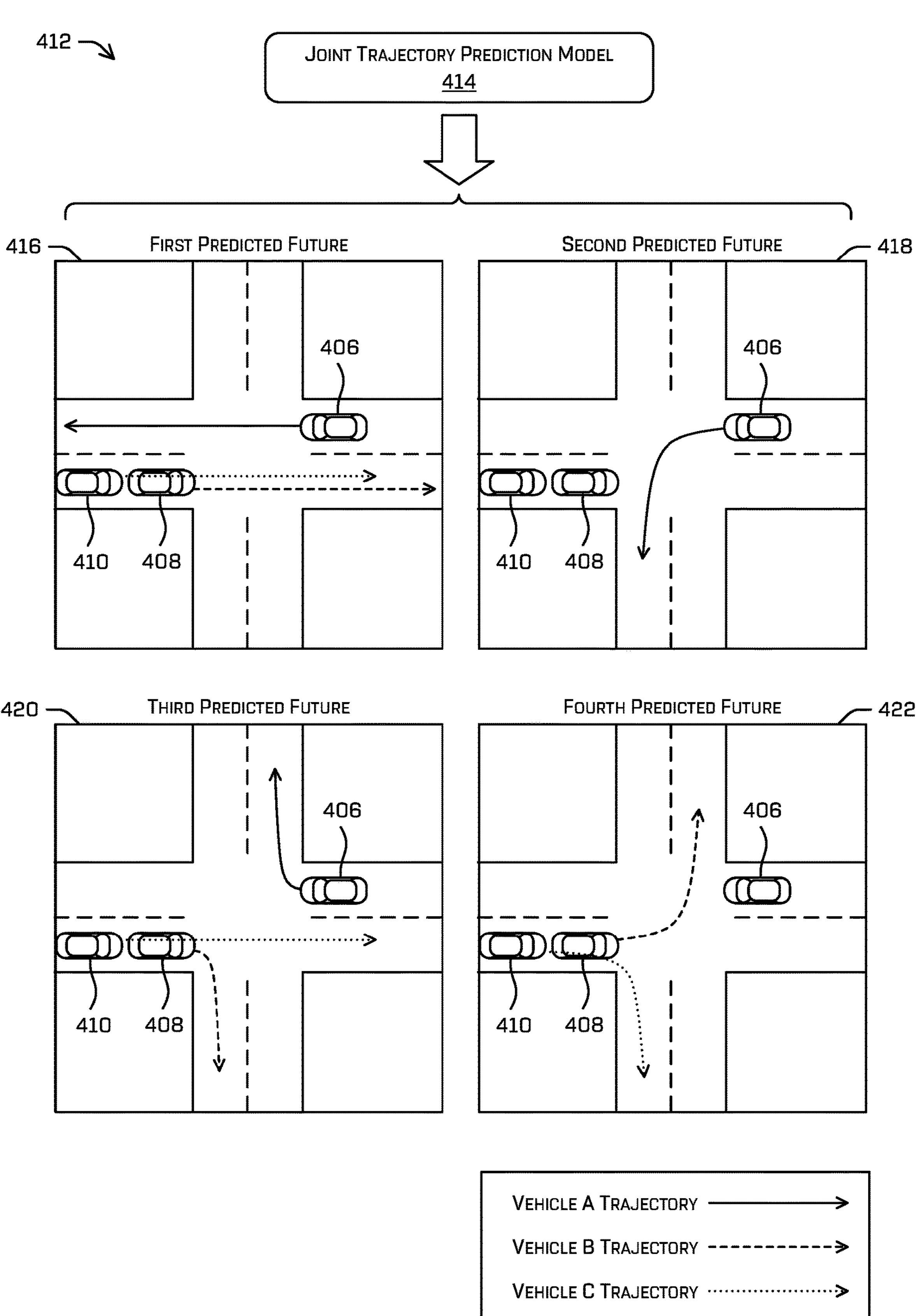
FIG. 4B depicts an example environment including a set of predicted trajectories for object in the environment determined using a joint ML trajectory prediction model, in accordance with one or more examples of the disclosure.

FIGS. 4A and 4B show example environments including sets of predicted trajectories for multiple objects in the environment, determined using an ML trajectory prediction model as described herein. As noted above, in some examples, prediction models may be configured to predict the trajectories for multiple agents independently, so that each agent trajectory prediction is performed without considering the trajectories of any other agents in the environment. An example of an individual trajectory prediction model is described below in FIG. 4A. In other examples, prediction models may be configured to jointly predict the trajectories of multiple agents in an environment, so that each predicted agent trajectory takes into account possible agent interactions based on the predicted trajectories of the agents in the environment. An example of a joint trajectory prediction model is described below in FIG. 4B.

FIG. 4A depicts an example 400 including a driving environment 404 viewed from a top-down view, and predicted trajectories that have been generated by an individual trajectory prediction model 402 for three vehicles (e.g., vehicle 406, vehicle 408, and vehicle 410) in the environment 404. As shown in this example, the individual trajectory prediction model 402 may determine the predicted trajectories for vehicles 406, 408, and 410 (which may be other types of agents in other examples) independently from one another. For example, the predicted trajectories in example 400 may be determined using only features associated with a node representing the specific vehicle for which the trajectory is to be predicted, and without using encoded information (e.g., edge features between the nodes of a GNN) representing the relative information of additional vehicles in the environment 404. As shown in FIG. 4A, many of the predicted trajectories of the vehicles 406, 408, and 410 may overlap in a way that could result in a collision and/or other unrealistic agent-to-agent interactions at future timesteps of the driving environment 404.

FIG. 4B depicts another example 412 including a driving environment viewed from a top-down view having multiple different predicted futures based on predicted trajectories for the vehicles 406, 408, and 410 determined by the joint trajectory prediction model 414. As shown in example 412, each of the predicted futures 416, 418, 420, and 422, may include a single predicted trajectory for each vehicle 406, 408, and 410 in the driving environment. In this example, the joint trajectory prediction model 414 may determine each of the possible predicted futures 416, 418, 420, and 422 by jointly determining sets of predicted trajectories for the vehicles relative to one another. In some examples, the predicted futures 416, 418, 420, and 422 may be determined using the features associated with a node representing a specific vehicle (e.g., vehicle 406, 408, or 410) and the information encoded (e.g., into the edge features between the nodes of a GNN) representing the relative information of the additional vehicles in the driving environment. As shown in FIG. 4B, each of the futures contains a predicted trajectory for each of the vehicles 406, 408, and 410 such that the trajectories are compatible (e.g., do not overlap and/or would not result in a potential collision or near-miss collision between the agents with each other at a future time point).

As an example, the second predicted future 418 in example 412 shows a predicted trajectory for vehicle 406 making a left turn across oncoming traffic. In this example, the trajectory for vehicle 406 may be determined using predicted positions of the vehicle 406 at various incremental timesteps (e.g., 8 predicted positions/poses determined over 8 seconds, one per second), such as, for example, predicted positions output by a GNN corresponding to the GNN described with respect to FIG. 3. During the updating process of the graph nodes associated with the vehicles 406, 408, and 410, the predicted position distributions output for vehicle 408 and/or vehicle 410 may be based on the predicted positions of vehicle 406. For instance, the edge between vehicle 406 and vehicle 408, and the edge between vehicle 406 and vehicle 410 may include information representing the state of 406, such as (for example) a state of the turn signals of vehicle 406 indicating that it is preparing to make a left turn at the intersection, and the current velocity/acceleration of vehicle 406 indicating that is beginning to perform the turn (e.g., rather than yielding). In response to this data, the distribution(s) output for vehicle 408 and/or vehicle 410 may include predicted positions that take into account that the vehicle 406 may imminently perform a left turn, and avoiding a prediction for vehicle 408 and/or vehicle 410 that results in a collision or other infeasible (or unrealistic) interaction between the vehicles.

Although FIG. 4B illustrates four different predicted futures for the driving environment, the joint trajectory prediction model 414 may output any number of futures (e.g., 1, 2, . . . , 10, . . . , 100, etc.) in other examples. Additionally, or alternatively, such processing may be executed in parallel, such as, for example, on one or more graphics processing units (GPUs) to determine the various futures substantially in parallel.

Figure 5:
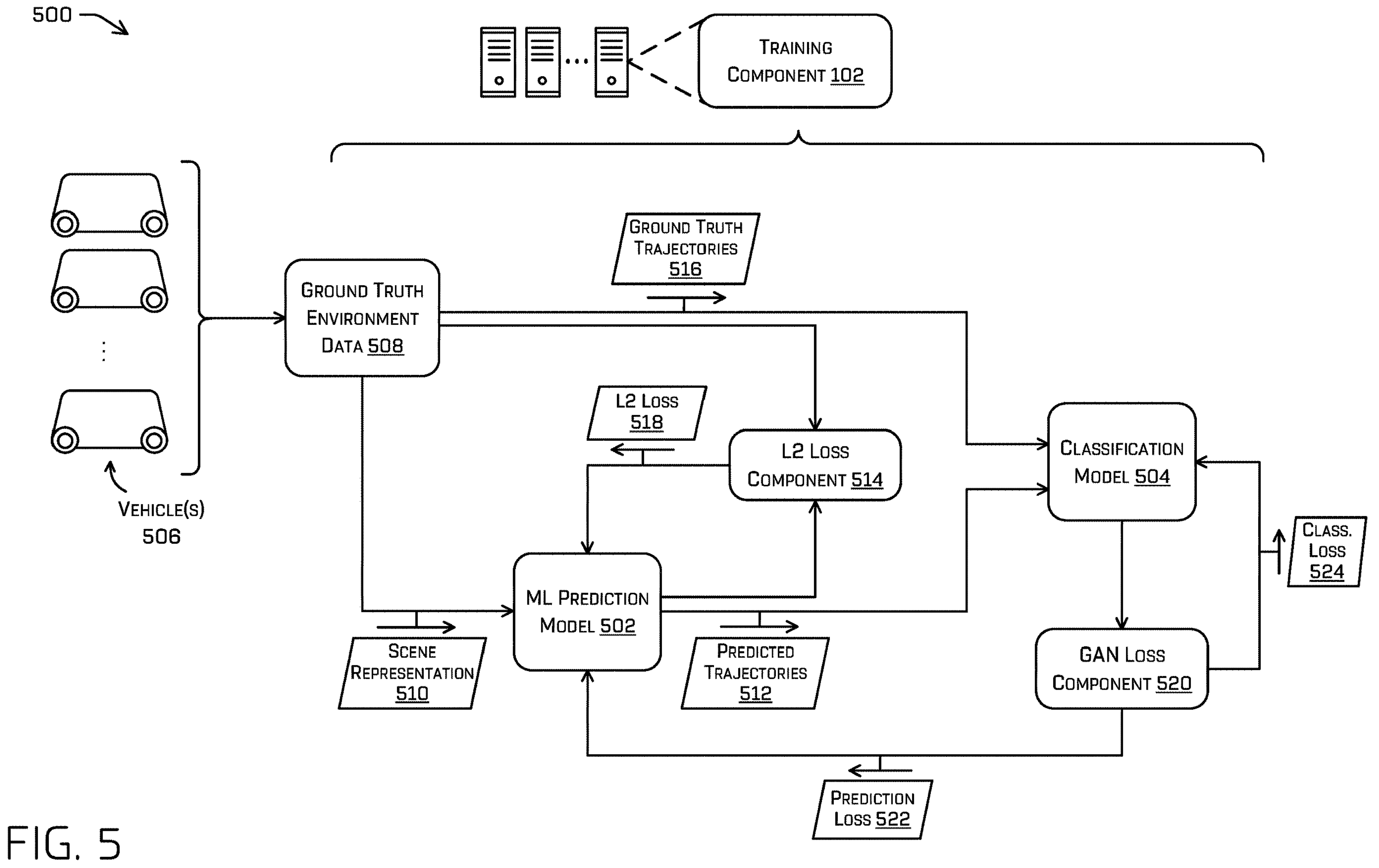
FIG. 5 is a block diagram illustrating an example system diagram for a training component configured to train an ML prediction model based on an output of a generative adversarial network (GAN), in accordance with one or more examples of the disclosure.

FIG. 5 depicts an example system 500 including a number of subcomponents within a training component 102 configured to train an ML trajectory prediction model 502 based on a combination of losses, including losses based on the accuracy of a set of jointly predicted agent trajectories relative to the corresponding ground truth trajectories of the agents, and auxiliary losses based on the degree to which the predicted agent trajectories represent realistic agent-to-agent interactions. As described below, the training component 102 in this example may determine the auxiliary loss during a training stage based on the output of a classification model 502 within a GAN.

During a training process for the prediction model 502, the training component 102 may receive ground truth environment data 508 (e.g., log data) associated with any number of vehicles 506. Vehicles 506 may include real-world and/or simulated autonomous vehicles operating in various types of driving environments and/or driving scenes. As described above, the ground truth environment data 508 may include sensor data captured by and/or perception data determined by the vehicles 506. The ground truth environment data 508 may include positions/states, trajectories, and other any perceived data associated with any number of agents in a driving environment, along with corresponding driving environment data (e.g., map data, road network data, traffic sign/signal, static and dynamic agent data, etc.), for any number of driving scenes. Each driving scene represented in the ground truth environment data 508 may include vehicle state and environment state data representing a period of time (e.g., 5 secs, 10 secs, 20 secs., etc.) during which one of the vehicles 506 detects and perceives one or more additional agents following agent trajectories (e.g., a ground truth trajectory) to traverse the driving environment.

The ML prediction model 502 in this example may be similar or identical to the ML model 144, trained ML prediction model 214, individual trajectory prediction model 402, and/or joint trajectory prediction model 414 described above. The ML prediction model 502 may be configured to receive a scene representation 510 as input, and may output a set of predicted agent trajectories based on the scene representation 510. As described above, the scene representation 510 provided as input to the ML prediction model 502 may include any combination of data representing the state of a driving environment at a particular time, including (e.g., encoding) the map/road data of the driving environment, the vehicle state and planned route of the vehicle that captured the ground data at the particular time, and the current positions/states of the additional agents (and other objects) in the environment at the particular time. In various examples, the scene representation 510 may include one or more of a GNN-based representation of the environment, a scene embedding data structure, a top-down multi-channel representation, a multidimensional vector, and/or various other input data representing the driving environment at the particular time.

Based on receiving the input driving scene representation 510 from the ground truth environment data 508, the ML prediction model 502 may output a set of predicted trajectories 512. The predicted trajectories 512 may include a set of jointly determined predicted trajectories for two or more agents represented in the driving scene representation 510, for a future period of time within the driving scene. As described above, the predicted trajectories 512 may include a sequence of vehicle states (e.g., positions, poses, headings, yaws, steering angles, accelerations, etc.) for each agent in the scene representation 510. As shown in this example, the training component 102 may use an L2 loss component 514 to determine a first loss value for training the ML prediction model, based on the accuracy of the set of predicted trajectories 512. The L2 loss component 514 may be configured to compare the predicted trajectories 512 to the ground truth trajectories 516 corresponding to the same agents in the same driving scene, and may use an L2 loss function (although other types of loss components/functions may be used in other examples) to determine the L2 loss 518 to be propagated back into the ML prediction model 502 during the training.

The training component 102 also may provide the predicted trajectories 512 output by the ML prediction model 502 and/or various sets of ground truth trajectories 516, to the classification model 504. As described above, the classification model 504 may be implemented with the ML prediction model 502 within a GAN structure. The classification model 504 may be a binary classification model configured to receive an input set of multiple agent trajectories associated with a driving scene and/or environment. The input set of agent trajectories may be a set of "real" ground truth trajectories 516, or a set of "artificial" predicted trajectories 512 output by the ML prediction model 502. The classification model 504, which may be unaware of the source of the set of input trajectories (or at least may operate as through it is unaware of the source), may analyze the set of trajectories and output an indication based on the trajectories, either that the input trajectories are a real set of trajectories (e.g., ground truth trajectories 516) or an artificially generated set of trajectories (e.g., predicted trajectories 512). Based on the output of the classification model 504, the training component 102 may determine whether the classification model 504 correctly identified (e.g., success) or incorrectly identified (e.g., failure) the trajectories as being real or artificially generated. As shown in this example, the training component 102 may provide any number of input trajectory sets to the classification model 504, including any number of sets of ground truth trajectories 516 and/or predicted trajectories 512, training the classification model 504 to more accurately distinguish between real and artificially generated sets of trajectories.

The result of the classification model 504, for example, an indication of the success or failure of the model, may be provided to a GAN loss component 520. Using the GAN loss component 520, the training component 102 may alternatively determine loss values for training the classification model 504 or the ML prediction model 502, such that there is an inverse relationship between the loss values used to train the different models. For example, in training stages when the classification model 504 correctly identifies a set of artificially generated input trajectories (e.g., predicted trajectories 512) as real, the GAN loss component 520 may determine a positive prediction loss 522 (corresponding to the auxiliary loss) that increases the L2 loss 518 that may be applied when training the ML prediction model 502 in the current training stage. In contrast, in training stages when the classification model 504 does not correctly identify whether a set of input trajectories is real or artificially generated (for both artificially generated input trajectories or ground truth input trajectories), the GAN loss component 520 may determine a classification loss 524 having a positive value that may be applied to train the classification model 504 in the current training stage.

Accordingly, FIG. 5 implements a GAN in which the ML prediction model 502 and the classification model 504 are alternatively trained so that they compete with one another and may continuously improve with respect to the performance of the other adversarial model. Based on the training process described in this example, the classification model 504 may be trained to more accurately recognize sets of trajectories that correspond to real agent interactions (e.g., ground truth trajectories 516), and to distinguish those from artificially generated sets of trajectories (e.g., predicted trajectories 512) having less realistic agent interactions. During the same training process in this example, the ML prediction model 502 may be trained to output sets of predicted agent trajectories that more accurately reflect more realistic agent interactions (e.g., increasingly similar to the agent interaction patterns of the ground truth trajectories 516).

In various examples, the sets of trajectories provided as input to the classification model 504 can include any number of agent trajectories (e.g., 2 or more) associated with the same driving scene. In some cases, the training component 102 may train the classification model 504 (and generate the auxiliary loss training the ML prediction model 502), by providing as input pairs of two agent trajectories at a time into the classification model 504. In other cases, the training component 102 may use a classification model 504 configured to receive larger sets of agent trajectories (e.g., 3, 4, . . . , 10, . . . , etc.) and/or may provide the complete set of trajectories for all agents in the driving scene.

Additionally, although this example describes providing sets of trajectories as input to the classification model 504, in other examples the training component 102 may be configured to provide different types of input data representing the agent interactions. For instance, instead of inputs of predicted trajectories 512 and/or ground truth trajectories 516, the classification model 504 may be configured to receive sets of distance values representing the distances between a pair of agents (or multiple pairs of agents) at periodic intervals over a period of time (e.g., the time period of the trajectories). Additionally or alternatively, the classification model 504 may be configured to receive sets of orientation difference angles, yaw difference angles, velocity differences, acceleration differences, etc., associated with pairs of agents in the driving environment.

Figure 6:
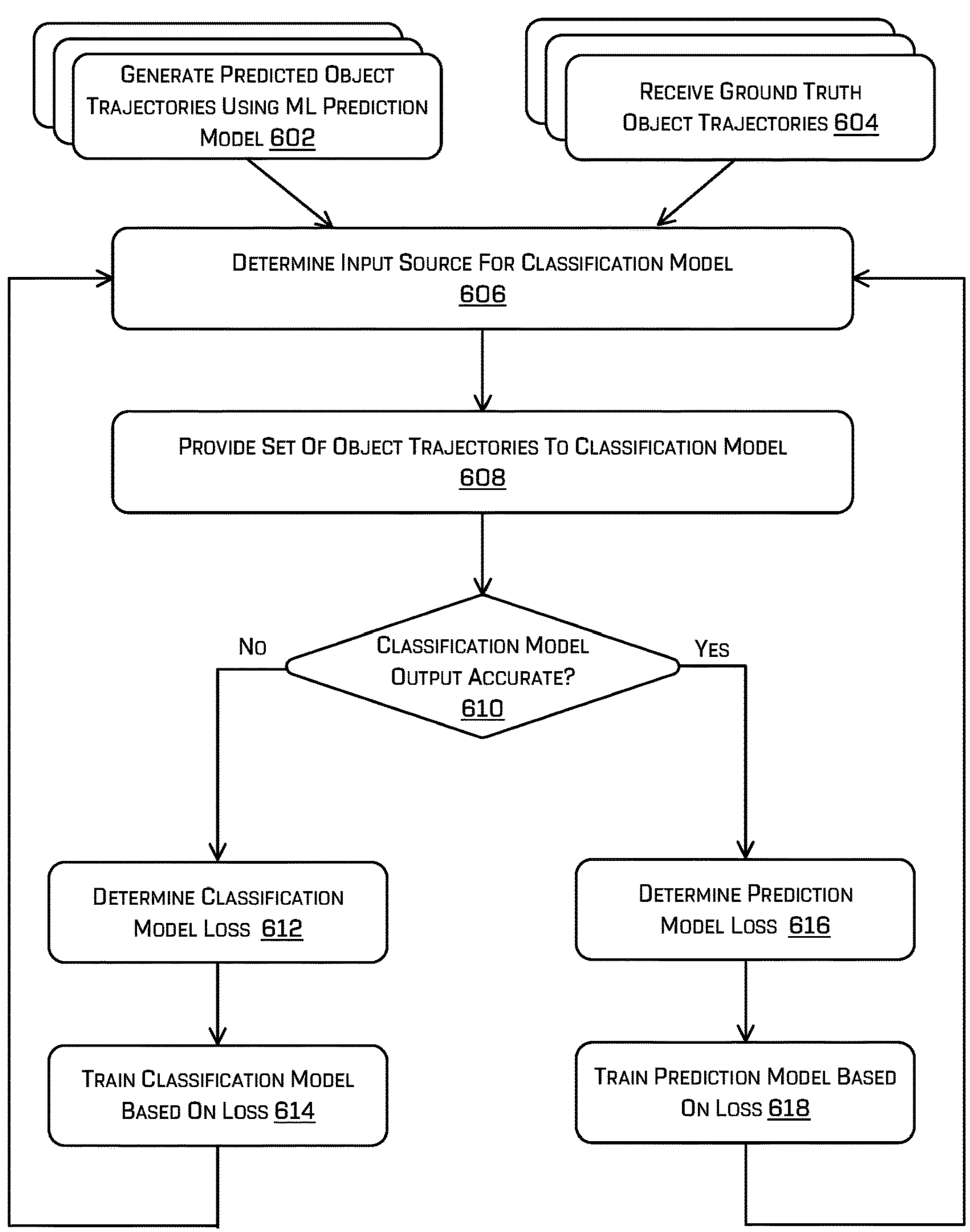
FIG. 6 is a flow diagram illustrating an example process for training an ML prediction model based on an output of a generative adversarial network (GAN), in accordance with one or more examples of the disclosure.

FIG. 6 is a flow diagram illustrating an example process 600 for training a trajectory prediction model based on an output of a GAN. In some examples, the operations of process 600 may be performed by a training component 102 including the various subcomponents and functionalities described above in reference to FIG. 5. For example, as described below, the example process 600 may be performed by a training component 102 including a classification model 504 and related components configured to determine an auxiliary loss for training the ML prediction model 502 based on the output and adversarial training of the classification model 504.

At operation 602, the training component 102 may execute the ML prediction model 502 any number of times, based on input data representing ground truth driving environments, to generate sets of predicted agent trajectories (e.g., predicted trajectories 512). Separately and/or independently, at operation 604, the training component 102 may receive any number of sets of ground truth agent trajectories (e.g., ground truth trajectories 516) from one or more driving scenes within the ground truth environment data 508.

At operation 606, the training component 102 may determine an input set of trajectories to provide to the classification model, including determining an input source corresponding to either the ground truth environment data 508 or the ML prediction model 502. Based on the source of a set of agent trajectories, the training component 102 may determine that the set of trajectories corresponds to real ground truth trajectories or artificial trajectories from the ML prediction model 502. At operation 608, the training component 102 may provide the input set of trajectories to the classification model 504. As discussed above, the classification model 504 may be configured to output an indication that the input trajectories are either a real set of trajectories (e.g., ground truth trajectories 516) or an artificially generated set of trajectories (e.g., predicted trajectories 512).

At operation 610, based on the output of the classification model 504, the training component may determine either that the classification model 504 correctly identified the source/authenticity of the set of agent trajectories (610: Yes), or that the classification model 504 did not successfully identify the source/authenticity of the input trajectories (610: No). As described above, when the classification model 504 does not correctly identify the source of the input trajectories (610: No), the training component 102 may determine a loss value (e.g., classification loss 524) in operation 612, and may use the loss value to train the classification model 504 in operation 614. By determining and applying the loss value in training stages only when the classification model 504 fails to identify the source/authenticity of the input trajectories, this process may iteratively train the classification model 504 to more accurately distinguish the agent interaction patterns represented in sets of ground truth trajectories 516 from those represented in sets of predicted trajectories 512.

In contrast, when the classification model 504 does correctly identify the source of the input trajectories (610: Yes), the training component 102 may determine a loss value (e.g., prediction loss 522) in operation 616, and may use the loss value as the auxiliary loss to train the ML prediction model 502 in operation 618. By determining and applying the loss value in training stages only when the classification model 504 correctly identifies the source/authenticity of the input trajectories, this process may iteratively train the ML prediction model 502 to generate sets of predicted agent trajectories that more accurately represent realistic agent interactions (e.g., and thus are more difficult for the classification model 504 to distinguish from ground truth trajectories 516).

Figure 7:
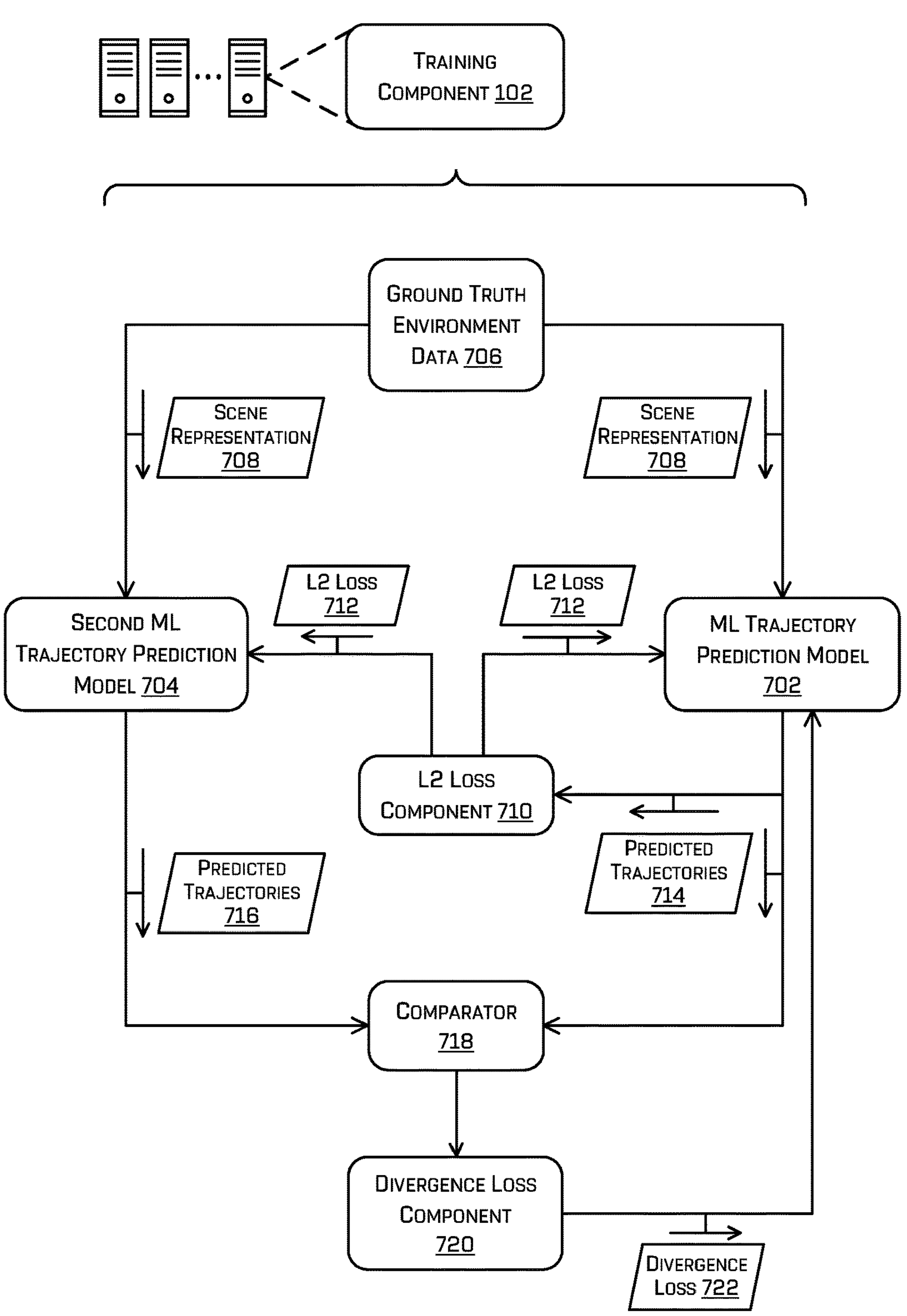
FIG. 7 is a block diagram illustrating another example system diagram for a training component configured to train an ML prediction model using a divergence loss between prediction models, in accordance with one or more examples of the disclosure.

FIG. 7 depicts another example system 700 including additional subcomponents that may be implemented in a training component 102 configured to train an ML trajectory prediction model 702 based on a combination of losses, including losses based on the accuracy of a set of jointly predicted agent trajectories relative to the corresponding ground truth trajectories of the agents, and auxiliary losses based on the degree to which the predicted agent trajectories represent realistic agent-to-agent interactions. As described below, the training component 102 in this example may determine the auxiliary loss during a training stage by comparing the output from the first (or primary) ML trajectory prediction model 702 (e.g., the ML model being trained during the training process) to the output from a second ML trajectory prediction model 704 that does not take into account the agent-to-agent interactions in the environment.

The ML trajectory prediction model 702 may be similar or identical to the ML model 144, the trained ML prediction model 214, the individual trajectory prediction model 402 or joint trajectory prediction model 414, and/or the ML prediction model 502 described above. As shown in this example, during a training process for the ML trajectory prediction model 702, the training component 102 may receive ground truth environment data 706 (e.g., log data) associated with any number of vehicles, driving scenes, and/or driving environments. The ground truth environment data 706 may be similar or identical to the ground truth environment data 508 described above in reference to FIG. 5.

The ML trajectory prediction model 702 being trained in this example, like the various prediction models described above, may be configured to receive a scene representation 708 of a driving scene/environment as input, and may output a set of predicted agent trajectories based on the scene representation 708. The scene representation 708 may be similar or identical to the scene representation 510 described above in reference to FIG. 5, and may include, for example, a GNN-based representation of the environment, a scene embedding data structure, a top-down multi-channel representation, a multidimensional vector, and/or various other input data representing a driving environment at a particular time.

As shown in this example, the training component 102 also may include a second ML trajectory prediction model 704, which may be similar or identical to the ML trajectory prediction model 702. During the training process for the ML trajectory prediction model 702, the training component 102 may provide similar scene representations 708 to the ML trajectory prediction model 702 and to the second ML trajectory prediction model 704. However, the ML trajectory prediction model 704 may use one or more techniques to mask out (e.g., ignore, remove, or down-weight) data from the scene representation 708 including agent proximity data and/or other indications of potential interactions between objects. In various examples, the second ML trajectory prediction model 704 may use the same model architecture or may use a different model architecture as the ML trajectory prediction model 702, and/or may use the same weights or different weights internally within the model, in order to effectively mask out or ignore the effect of agent-to-agent interactions within the predicted trajectories output by model.

In some cases, the input data to the ML trajectory prediction model 702 and the second ML trajectory prediction model 704 (e.g., scene representation 708) may include feature data representing the state of each agent and/or object in the environment, along with map data of the environment. Within the ML trajectory prediction model 702, one or more intermediate layers and/or components may determine the relative distances (and/or other relative state data) between the agents, and may use the relative data in a subsequent layer or component determining the overall model output (e.g., the set of predicted trajectories). In contrast, within the second ML trajectory prediction model 704, the intermediate layers and/or components that determine the relative agent state data may be skipped (e.g., based on a flag being set within the second model) or down-weighted so that the output of the second ML trajectory prediction model 704 does not take into account any potential interactions between the agents.

In various other examples, the input data to the second ML trajectory prediction model 704 (e.g., scene representation 708) may be modified to mask to remove the data indicating the relative positions and/or distances between pairs of agents in the driving environment. For instance, depending on the type of input structures and/or the neural networks used to implement the trajectory prediction models 702 and 704, a masking component configured before or within the second ML trajectory prediction model 704 may use various different techniques to remove the agent proximity data (and/or additional object interaction data) from the scene representation 708. For instance, for prediction models using a GNN-based representation of the environment, the interaction mask component may modify or remove edge features of the GNN representing the distances between agents and/or other information that may be communicated between pairs of agents via the GNN. In other examples, for prediction models using top-down representations of driving environments and/or scene encodings, a masking component may modify or remove feature vectors representing distances between agents, etc., so that the relative distance data is not used by the second ML trajectory prediction model 704. In still other examples, the second ML trajectory prediction model 704 may be run multiple times on each agent individually, while ignoring (e.g., within the intermediate layers of the model) the presence of all other agents in the environment.

After the scene representation 708 has been provided to the ML trajectory prediction model 702 and to the (modified) second ML trajectory prediction model 704, the training component 102 may execute both models based on the input scene representation 708, to determine a first set of predicted trajectories 714 output by the ML trajectory prediction model 702 and a second set of predicted trajectories 716 output by the second ML trajectory prediction model 704. The first set of predicted trajectories 714 may be provided to an L2 loss component 710, which may be similar or identical to the L2 loss component 514 described above in reference to FIG. 5. The L2 loss component 710 may determine L2 loss data 712, for example, based on the accuracy of the set of predicted trajectories 714 relative to a corresponding set of ground truth trajectories (e.g., from ground truth environment data 706). The L2 loss component may use an L2 loss function (although other types of loss components/functions may be used in other examples) to determine the L2 loss 712, which may be used for training both the ML trajectory prediction model 702 and the second ML trajectory prediction model 704.

Additionally, the first set of predicted trajectories 714 output by the ML trajectory prediction model 702, and the second set of predicted trajectories 716 output by the second ML trajectory prediction model 704, may be provided to a comparator 718 configured to analyze and determine differences between the two sets of predicted trajectories. In various examples, the comparator 718 may compare the predicted sequences of agent positions, poses, and/or other state data between one or more agents within the different sets of predicted trajectories 714 and 716, to determine a value representing the magnitude of the difference between the sets of predicted trajectories. The size of the difference between the different sets of predicted trajectories 714 and 716 (which may be another example of interaction data) then may be used by a divergence loss component 720 to determine a divergence loss 722 (e.g., as the auxiliary loss) to be used in the current training stage of the ML trajectory prediction model 702.

In some examples, when the comparator 718 determines no difference or a relatively small difference (e.g., below a threshold amount) between the sets of predicted trajectories 714 and 716, the divergence loss component 720 may increase the size of the divergence loss 722. The divergence loss 722 may be weighted (e.g., multiplied by a coefficient value) and then added to the L2 loss 712, or otherwise used in conjunction with the L2 loss 712, as the loss to be used in a current training stage of the ML trajectory prediction model 702. In other examples, when the comparator 718 determines a relatively larger difference (e.g., greater than a threshold amount) between the sets of predicted trajectories 714 and 716, then the divergence loss component 720 may determine decrease (or reduce to zero) the size of the divergence loss, so that less or no auxiliary loss may be added to the L2 loss 712 in the current training stage of the ML trajectory prediction model 702.

As described above, in some examples, the ML trajectory prediction model 702 and ML trajectory prediction model 704 may use a similar or identical model architecture, and may be designed/weighted so that difference in their respective outputs (e.g., predicted trajectories 714 and predicted trajectories 716) may be entirely attributable to the masking out of agent-to-agent distances and/or other information that may be communicated between pairs of agents in the scene representation 708. Therefore, by determining and applying a larger divergence loss 722 when the outputs of the models are the same (or sufficiently similar), and a smaller divergence loss 722 (or no divergence loss 722) when the outputs of the models sufficient diverge, the training component 102 may train the ML trajectory prediction model 702 to increase its reliance on the agent-to-agent distance data and/or other information communicated between agents in the scene representation 708.

Although the ML trajectory prediction model 702 and the second ML trajectory prediction model 704 are depicted as two separate models in this example, in other examples the second ML trajectory prediction model 704 need not be used. For instance, the training component 102 may provide the ML trajectory prediction model 702 a first input with an unmasked scene representation (e.g., scene representation 708) and a second input with a masked scene representation (e.g., removing/obscuring relative agent distances and states), and may store and compare the respective outputs (e.g., predicted trajectories 714 and predicted trajectories 716) via the comparator 718.

In other examples, the ML trajectory prediction model 702 and the second ML trajectory prediction model 704 need not be identical, but may use different techniques for predicting agent trajectories. For instance, the ML trajectory prediction model 702 may be a joint trajectory prediction model configured to jointly determine sets of predicted trajectories for the multiple agents that are compatible with one another, and the ML trajectory prediction model 702 may be an individual trajectory prediction model configured to determine sets of predicted agent trajectories independently from one another (e.g., and thus the agent trajectories in the set may be potentially incompatible).

In various cases, when a divergence loss 722 is determined for a training stage of the ML trajectory prediction model 702, the divergence loss 722 can either be applied to the final output of the ML trajectory prediction model 702, or a latent variable (e.g., an agent-specific feature embedding) within the model. When the divergence loss 722 is applied to a latent variable of the ML trajectory prediction model 702, rather than to the final model output, this training technique may provide additional advantages when handling stationary agents. For example, for a stationary agent, the predicted trajectories outputs by the ML trajectory prediction models 702 and 704 may be same, regardless of whether any agent interaction was included in the input to the model (e.g., scene representation 708 or 712). Therefore, applying the divergence loss 722 as a latent variable to the stationary agent only (e.g., which may have other latent variables mapped to the same output), may prevent the divergence loss 722 from negatively affecting the overall output of the prediction model.

Figure 8:
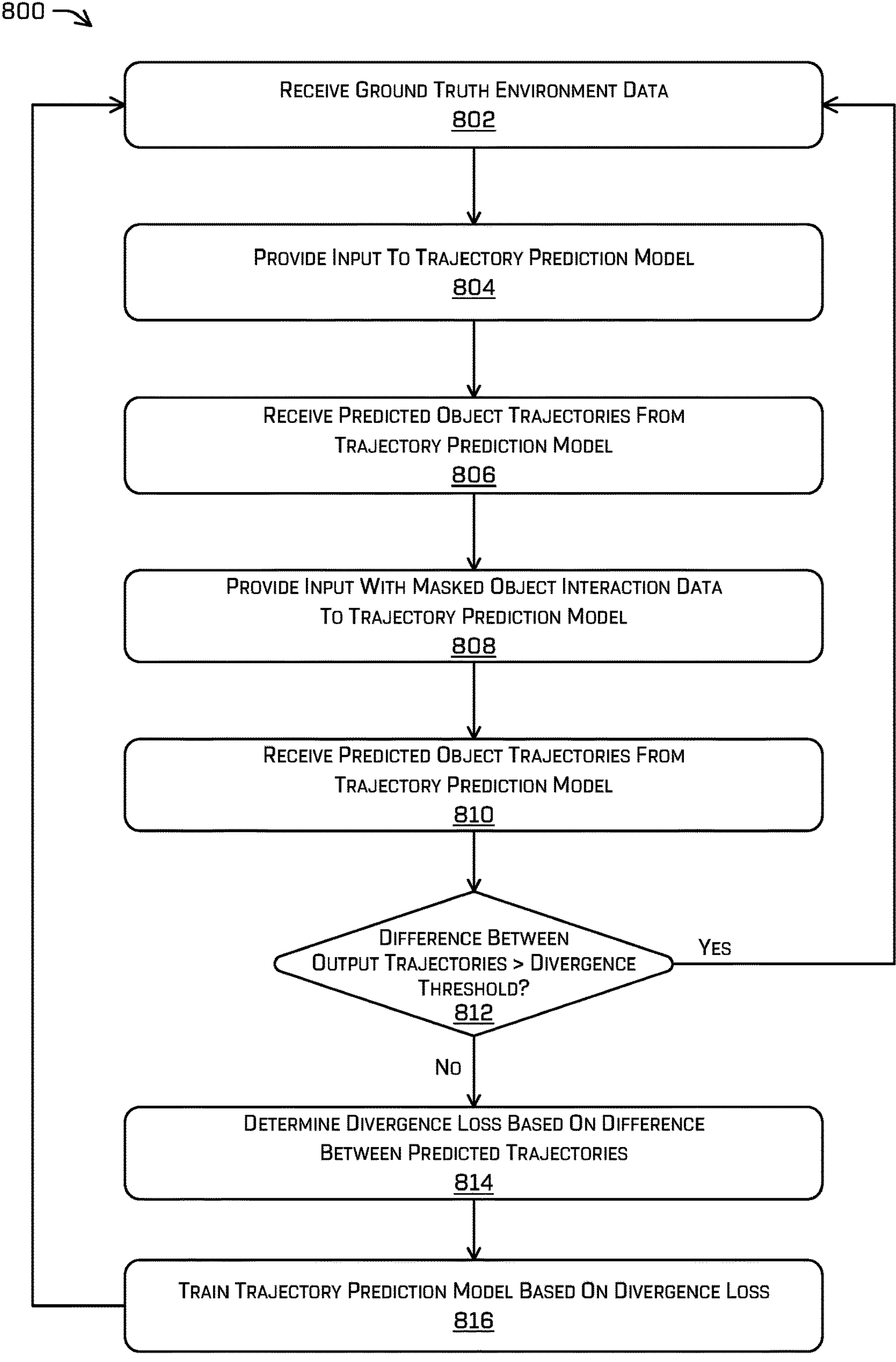
FIG. 8 is a flow diagram illustrating an example process for training an ML prediction model based on a divergence loss, in accordance with one or more examples of the disclosure.

FIG. 8 is a flow diagram illustrating an example process 800 for training a trajectory prediction model based on a divergence loss between two prediction models provided with different agent interaction data as input. In some examples, the operations of process 800 may be performed by a training component 102 including the various subcomponents and functionalities described above in reference to FIG. 7. For example, as described below, the example process 800 may be performed by a training component 102 including a two similar or identical prediction models 702 and 704, and related components configured to determine an auxiliary loss for training the ML prediction model 702 based on a divergence between the outputs of the two models.

At operation 802, the training component 102 may receive one or more sets of ground truth environment data (e.g., log data) representing a driving scene having multiple agents in the driving environment. At operation 804, the training component 102 may generate and provide input to an ML trajectory prediction model 702. As described above, the input to the prediction model may include a scene representation 708 based on a combination of data representing the state of a driving environment at a particular time, including (e.g., encoding) the map/road data of the driving environment, the vehicle state and planned route of the vehicle that captured the ground data at the particular time, and the current positions/states of the additional agents (and other objects) in the environment at the particular time. In various examples, the scene representation 708 may include one or more GNN-based representations of the environment, scene embedding data structures, top-down multi-channel representations, multidimensional vectors, and/or various other input data representing the driving environment at the particular time. At operation 806, the training component 102 may receive a corresponding output from the ML trajectory prediction model 702, including a first set of predicted agent trajectories (e.g., predicted trajectories 714).

At operation 808, the training component 102 may generate and provide an input based on the same scene representation 708, where the agent interaction data is masked out of the input (e.g., masked scene representation 712), to a similar or identical ML trajectory prediction model 702. As described above, the masked input data determined in operation 808 may represent the same driving scene, but may be modified to remove (or mask out) data including distances between agents and/or other indications of potential communication or interactions between agents. For instance, for prediction models using a GNN-based representation of the environment, masking the model input in operation 808 may include modifying and/or removing edge features of the GNN representing the distances between agents and/or other information that may be communicated between pairs of agents via the GNN. In other examples, masking out agent interaction data may include modifying or removing feature vectors representing distances between agents or other agent-to-agent signals in the environment representation, etc. At operation 810, the training component 102 may receive another output from the ML trajectory prediction model invoked in operation 808, including a second set of predicted agent trajectories (e.g., predicted trajectories 716).

In operation 812, the training component 102 may use a comparator 718 to determine the differences between the sets of predicted trajectories 714 and 716 output by the prediction models. In some examples, when the comparator 718 determines that the predicted trajectories 714 and 716 are the same or sufficiently similar (e.g., less than or equal to an L2 loss threshold) (812: No), then at operation 814 the training component 102 may determine a divergence loss 722, and at operation 816 the training component 102 may use the divergence loss 722 as the auxiliary loss to train the ML trajectory prediction model 702. In other examples, when the comparator 718 determines that the predicted trajectories 714 and 716 are not the same, or sufficiently different (e.g., greater than or equal to an L2 loss threshold) (812: Yes), then no divergence loss is applied and process 800 returns to operation 802 to commence the next training stage.

Various techniques are described herein for determining an auxiliary loss based on the evaluation of the agent-to-agent interactions represented in the predicted trajectories, and then applying the auxiliary loss when training the prediction model. For example, FIGS. 5-6 describe a technique for determining auxiliary loss based on the output of a GAN, and FIGS. 7-8 describe a technique for determining auxiliary loss based on a divergence loss between two prediction models provided with different agent interaction data as input. These techniques and/or the other techniques herein for determining and applying auxiliary loss based on agent-to-agent interactions to train models may be used individually or in combination in various examples. Additionally, any of these techniques may include using heuristics to selectively apply the techniques during the model training process, and/or weighting the auxiliary to control the degree to which the techniques cause increased reliance on agent-to-agent interactions during the model training process. For example, these techniques for determining and applying auxiliary losses during training may be applied for some training data and not for other training data (or may be weighted up or down) based on the driving scene location, type, context, or any other characteristics of the driving scene in the training data. Such characteristics may include whether the driving scene in the training data is sparsely or densely populated with additional agents, the type of the driving scene (e.g., highway driving, city driving, parking lots, etc.), and/or the velocity of the agents including whether one or more of the agents is stopped (e.g., at a crosswalk, railroad crossing, traffic signal, etc.). As an example, the training component 102 may selectively apply (or may up-weight) the auxiliary loss only when the number and/or density of agents in the driving scene is greater than a threshold, which may indicate an increase in the relative importance of agent-to-agent interactions in trajectory predictions. In contrast, the training component 102 may determine not to apply (or may down-weight) the auxiliary loss when the driving scene has a fewer number and/or lesser density of agents, which may indicate less importance of agent-to-agent interactions. Additional characteristics that may be included in selectively applying or weighting the auxiliary loss may include various characteristics of the driving scene itself, such as the weather conditions, lighting conditions, traffic conditions, road conditions, etc. Any or all of these techniques, including selectively applying and/or weighting (up or down) the auxiliary loss based on agent interactions, can be used at the level of individual agents or the driving scene as a whole.

Figure 9:
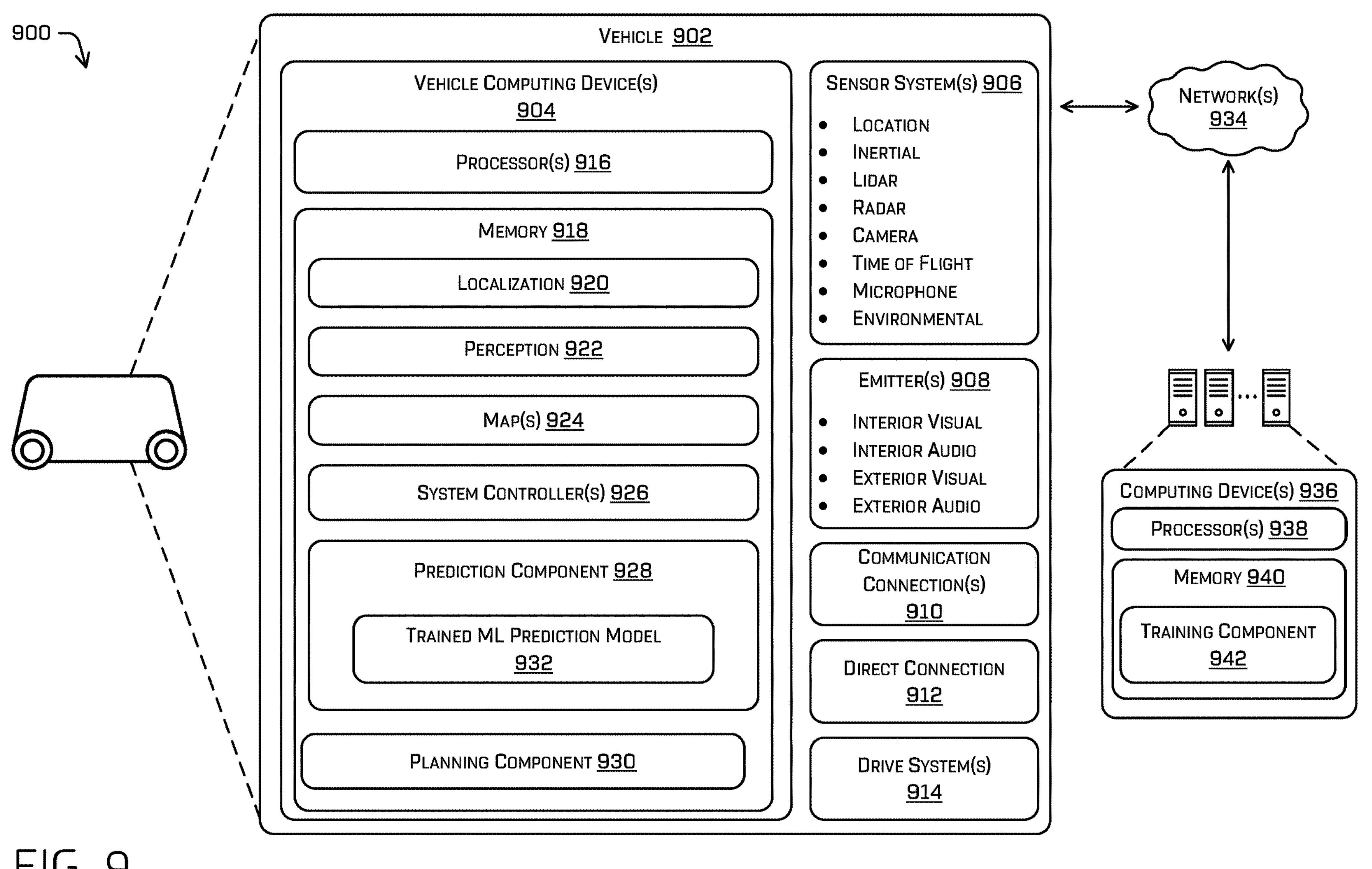
FIG. 9 is a block diagram illustrating an example architecture including a vehicle and a computing system for training ML prediction models, in accordance with one or more examples of the disclosure.

FIG. 9 illustrates a block diagram of an example system 900 that implements the techniques discussed herein. In some instances, the example system 900 may include a vehicle 902, which may represent the vehicle 108 in FIG. 1 and/or vehicle 202 in FIG. 2. In some instances, the vehicle 902 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 902 may be a fully or partially autonomous vehicle having any other level or classification. Moreover, in some instances, the techniques described herein may be usable by non-autonomous vehicles as well.

The vehicle 902 may include vehicle computing device(s) 904, sensor(s) 906, emitter(s) 908, network interface(s) 910, at least one direct connection 912 (e.g., for physically coupling with the vehicle to exchange data and/or to provide power), and one or more drive system(s) 914. In this example, the vehicle 202 may correspond to vehicle 902 discussed above, in which vehicle computing device(s) 904 may represent computing device(s) 206 and sensor(s) 906 may represent sensor(s) 204. The system 900 may additionally or alternatively comprise computing device(s) 904

In some instances, the sensor(s) 906 may include lidar sensors, radar sensors, ultrasonic transducers, sonar sensors, location sensors (e.g., global positioning system (GPS), compass,), inertial sensors (e.g., inertial measurement units (IMUs), accelerometers, magnetometers, gyroscopes,), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors,), etc. The sensor(s) 906 may include multiple instances of each of these or other types of sensors. For instance, the radar sensors may include individual radar sensors located at the corners, front, back, sides, and/or top of the vehicle 902. As another example, the cameras may include multiple cameras disposed at various locations about the exterior and/or interior of the vehicle 902. The sensor(s) 906 may provide input to the vehicle computing device(s) 904 and/or to computing device(s) 936.

The vehicle 902 may also include emitter(s) 908 for emitting light and/or sound, as described above. The emitter(s) 908 in this example may include interior audio and visual emitter(s) to communicate with passengers of the vehicle 902. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners,), and the like. The emitter(s) 908 in this example may also include exterior emitter(s). By way of example and not limitation, the exterior emitter(s) in this example include lights to signal a direction of travel or other indicator of vehicle action (e.g., indicator lights, signs, light arrays,), and one or more audio emitter(s) (e.g., speakers, speaker arrays, horns,) to audibly communicate with pedestrians or other nearby vehicles, one or more of which comprising acoustic beam steering technology.

The vehicle 902 may also include network interface(s) 910 that enable communication between the vehicle 902 and one or more other local or remote computing device(s). For instance, the network interface(s) 910 may facilitate communication with other local computing device(s) on the vehicle 902 and/or the drive system (s) 914. Also, the network interface(s) 910 may additionally or alternatively allow the vehicle to communicate with other nearby computing device(s) (e.g., other nearby vehicles, traffic signals, etc.). The network interface(s) 910 may additionally or alternatively enable the vehicle 902 to communicate with computing device(s) 936. In some examples, computing device(s) 936 may comprise one or more nodes of a distributed computing system (e.g., a cloud computing architecture)

The network interface(s) 910 may include physical and/or logical interfaces for connecting the vehicle computing device(s) 904 to another computing device or a network, such as network(s) 934. For example, the network interface(s) 910 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 904 and/or the sensor(s) 906 may send sensor data, via the network(s) 934, to the computing device(s) 936 at a particular frequency, after a lapse of a predetermined period of time, in near real-time, etc.

In some instances, the vehicle 902 may include one or more drive system (s) 914 (or drive components). In some instances, the vehicle 902 may have a single drive system 914. In some instances, the drive system(s) 914 may include one or more sensors to detect conditions of the drive system(s) 914 and/or the surroundings of the vehicle 902. By way of example and not limitation, the sensor(s) of the drive system (s) 914 may include one or more wheel encoders (e.g., rotary encoders) to sense rotation of the wheels of the drive components, inertial sensors (e.g., inertial measurement units, accelerometers, gyroscopes, magnetometers) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive system (s) 914. In some cases, the sensor(s) on the drive system (s) 914 may overlap or supplement corresponding systems of the vehicle 902 (e.g., sensor(s) 906).

The drive system (s) 914 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system (s) 914 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive system (s) 914. Furthermore, the drive system (s) 914 may also include one or more communication connection(s) that enable communication by the respective drive component with one or more other local or remote computing device(s).

The vehicle computing device(s) 904 may include processor(s) 916 and memory 918 communicatively coupled with the one or more processors 916. Memory 918 may represent memory 208. Computing device(s) 936 may also include processor(s) 938, and/or memory 940. The processor(s) 916 and/or 938 may be any suitable processor capable of executing instructions to process data and perform operations as described herein. By way of example and not limitation, the processor(s) 916 and/or 938 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 918 and/or 940 may be examples of non-transitory computer-readable media. The memory 918 and/or 940 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 918 and/or memory 940 may store a localization component 920, perception component 922, maps 924, system controller(s) 926, prediction component 928, planning component 930, and/or trained ML prediction model(s) 932. Perception component 922 may represent perception component 210, the prediction component 928 may represent the prediction component 212, the planning component 930 may represent planning component 216, and the ML prediction model(s) 932 may represent the model(s) 214, and/or system controller(s) 926 may represent controller(s) 218.

In at least one example, the localization component 920 may include hardware and/or software to receive data from the sensor(s) 906 to determine a position, velocity, and/or orientation of the vehicle 902 (e.g., one or more of an x-, y-, z-position, roll, pitch, or yaw). For example, the localization component 920 may include map(s) of an environment and can continuously determine a location, velocity, and/or orientation of the autonomous vehicle within the map(s). In some instances, the localization component 920 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 920 may provide data to various components of the vehicle 902 to determine an initial position of an autonomous vehicle for generating a trajectory and/or for generating map data, as discussed herein. In some examples, localization component 920 may provide, to the planning component 930 and/or to the prediction component 928 (e.g., to the ML prediction model(s) 932), a location and/or orientation of the vehicle 902 relative to the environment and/or sensor data associated therewith.

The memory 918 can further include one or more maps 924 that can be used by the vehicle 902 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 924 may include at least one map (e.g., images and/or a mesh) generated in accordance with the techniques discussed herein. In some examples, the vehicle 902 can be controlled based at least in part on the maps 924. That is, the maps 924 can be used in connection with the localization component 920, the perception component 922, and/or the planning component 930 to determine a location of the vehicle 902, identify objects in an environment, and/or generate routes and/or trajectories to navigate within an environment.

In some instances, the perception component 922 may comprise a primary perception system and/or a prediction system implemented in hardware and/or software. The perception component 922 may detect object(s) in an environment surrounding the vehicle 902 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 922 is referred to as perception data.

In some examples, sensor data and/or perception data may be used to generate an environment state that represents a current state of the environment. For example, the environment state may be a data structure that identifies object data (e.g., object position, area of environment occupied by object, object heading, object velocity, historical object data), environment layout data (e.g., a map or sensor-generated layout of the environment), environment condition data (e.g., the location and/or area associated with environmental features, such as standing water or ice, whether it's raining, visibility metric), sensor data (e.g., an image, point cloud), etc. In some examples, the environment state may include a top-down two-dimensional representation of the environment and/or a three-dimensional representation of the environment, either of which may be augmented with object data. In yet another example, the environment state may include sensor data alone. In yet another example, the environment state may include sensor data and perception data together.

The prediction component 928 can receive sensor data from the sensor system(s) 906, map data, and/or perception data output from the perception component 922 (e.g., processed sensor data), and can output predictions associated with one or more objects within the environment of the autonomous vehicle. For example, the prediction component 928 can include one or more ML prediction models 932, trained using the various techniques described herein, to predict trajectories (and/or other future state data) associated with agent in the environment in which the vehicle 902 is operating. In this example, the prediction component 928 may correspond to the prediction component 212 discussed above, and the prediction models 932 may include any of the various prediction models described herein (e.g., ML model 144, ML prediction model 502, ML prediction model 702, etc.). The prediction models 932 may receive sensor data from the sensor(s), and/or perception data from the perception component 922 after the perception component 922 processes at least some of the sensor data to produce the perception data. In some examples, the prediction models 932 may comprise one or more GNNs and/or other ML models that are trained to jointly predict trajectories of multiple agents based at least in part on the sensor data and/or the perception data. In some examples, the prediction models 932 of the vehicle 902 may be transmitted from the computing device(s) 936 to the vehicle 902 after the prediction models 932 have been trained wholly or in part by the computing device(s) 936, using a training component 942. The training component 942 may be similar or identical to training component 102 and/or training component 232, discussed above, and may include one or more machine learning algorithms, and may apply one or more machine learning algorithms to train the prediction models 932 using log data provided by the various vehicles as ground truth data.

The planning component 930 may receive a location and/or orientation of the vehicle 902 from the localization component 920, perception data from the perception component 922, and/or predicted trajectories from the ML prediction model(s) 932, and may determine instructions for controlling operation of the vehicle 902 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 926 and/or drive system (s) 914 may parse/cause to be carried out, second instructions for the emitter(s) 908 may be formatted according to a second format associated therewith). In at least one example, the planning component 930 may comprise a nominal trajectory generation subcomponent that generates a set of candidate trajectories, and selects a trajectory for implementation by the drive system (s) 914 based at least in part on determining a cost associated with a trajectory according to U.S. patent application Ser. No. 16/517,506, filed Jul. 19, 2019 and/or U.S. patent application Ser. No. 16/872,284, filed May 11, 2020, the entirety of which are incorporated herein for all purposes.

The memory 918 and/or 940 may additionally or alternatively store a mapping system (e.g., generating a map based at least in part on sensor data), a planning system, a ride management system, etc. Although localization component 920, perception component 922, the prediction component 928, the planning component 930, the ML prediction model(s) 932, and/or system controller(s) 926 are illustrated as being stored in memory 918, any of these components may include processor-executable instructions, machine-learned model(s) (e.g., a neural network), and/or hardware and all or part of any of these components may be stored on memory 940 or configured as part of computing device(s) 936.

As described herein, the localization component 920, the perception component 922, the prediction component 928, the planning component 930, and/or other components of the system 900 may comprise one or more ML models. For example, the localization component 920, the perception component 922, the prediction component 928, and/or the planning component 930 may each comprise different ML model pipelines. The ML prediction model(s) 932 may use a different ML model or a combination of different ML models in different circumstances. For example, the ML prediction model(s) 932 may use different GNNs, RNNs, CNNs, MLPs and/or other neural networks tailored to outputting predicted agent trajectories in different seasons (e.g., summer or winter), different driving conditions and/or visibility conditions (e.g., times when border lines between road lanes may not be clear or may be covered by snow), and/or based on different crowd or traffic conditions (e.g., more conservative trajectories in a crowded traffic conditions such as downtown areas, etc.). In various examples, any or all of the above ML models may comprise a GNN or any other neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

Memory 918 may additionally or alternatively store one or more system controller(s) 926, which may be configured to control steering, propulsion, braking, safety, emitters, communication, and other systems of the vehicle 902. These system controller(s) 926 may communicate with and/or control corresponding systems of the drive system (s) 914 and/or other components of the vehicle 902.

In an additional or alternate example, vehicle 902 and/or computing device(s) 936 may communicate (e.g., transmit and/or receive messages over network(s) 934) with one or more passenger devices (not shown). A passenger device may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 902. For example, the passenger device may additionally or alternatively comprise a display and/or one or more input/output devices, such as a touchscreen, microphone, speaker, and/or the like. In some examples, the vehicle 902 may transmit messages and/or receive messages from the passenger device.

It should be noted that while FIG. 9 is illustrated as a distributed system, in alternative examples, components of the vehicle 902 may be associated with the computing device(s) 936 and/or components of the computing device(s) 936 may be associated with the vehicle 902. That is, the vehicle 902 may perform one or more of the functions associated with the computing device(s) 936, and vice versa.

Example Clauses

A. A system comprising: one or more processors; and one or more computer-readable media storing computer-executable instructions that, when executed, cause the one or more processors to perform operations comprising: receiving data representing an environment, the data including a first trajectory associated with a first object in the environment and a second trajectory associated with a second object in the environment; providing at least a portion of the data as a first input to a machine learning model, wherein the machine learning model is a joint prediction model configured to output a set of compatible trajectory predictions within the environment; determining, based at least in part on an output of the machine learning model, a first predicted trajectory for the first object and a second predicted trajectory for the second object; determining a first loss value associated with the machine learning model, based at least in part on: a first difference between the first trajectory and the first predicted trajectory; and a second difference between the second trajectory and the second predicted trajectory; determining, based at least in part on the first predicted trajectory and the second predicted trajectory, interaction data associated with a predicted interaction between the first object and the second object; determining a second loss value based at least in part on the interaction data; training the machine learning model based at least in part on the first loss value and the second loss value, to determine a trained machine learning model; and transmitting the trained machine learning model to a computing device associated with a vehicle, wherein operation of the vehicle is based at least in part on executing the trained machine learning model.

B. The system of paragraph A, wherein determining the interaction data comprises: providing a second input to a classification model, wherein the second input is based at least in part on the first predicted trajectory and the second predicted trajectory; and determining the interaction data based at least in part on an output of the classification model.

C. The system of paragraph B, wherein determining the second loss value comprises: increasing a prediction loss value associated with the machine learning model, based at least in part on the interaction data; and decreasing a classification loss value associated with the classification model, based at least in part on the interaction data.

D. The system of paragraph A, wherein determining the interaction data comprises: providing at least a portion of the data as a second input to a second machine learning model; determining, based at least in part on an output of the second machine learning model, a third predicted trajectory for the first object and a fourth predicted trajectory the second object; and determining the interaction data based at least in part on a difference between the output of the machine learning model and the output of the second machine learning model.

E. The system of paragraph D, wherein determining the second loss value comprises: increasing a prediction loss value associated with the machine learning model, based at least in part on determining that the difference is less than a difference threshold.

F. A method comprising: receiving data representing an environment at a first time, the environment including a first object and a second object; providing at least a portion of the data as a first input to a machine learning model; determining, based at least in part on an output of the machine learning model, a first predicted trajectory for the first object and a second predicted trajectory for the second object; determining, based at least in part on the first predicted trajectory and the second predicted trajectory, interaction data associated with a predicted interaction between the first object and the second object; determining a loss value based at least in part on the interaction data; training the machine learning model based at least in part on the loss value, to determine a trained machine learning model; and controlling operation of a vehicle, based at least in part on the trained machine learning model.

G. The method of paragraph F, wherein determining the interaction data comprises: providing a second input to a classification model, wherein the second input is based at least in part on the first predicted trajectory and the second predicted trajectory; and determining the interaction data based at least in part on an output of the classification model.

H. The method of paragraph G, wherein determining the loss value comprises: increasing a prediction loss value associated with the machine learning model, based at least in part on the interaction data; and decreasing a classification loss value associated with the classification model, based at least in part on the interaction data.

I. The method of paragraph F, wherein determining the interaction data comprises: providing at least a portion of the data as a second input to a second machine learning model; determining, based at least in part on an output of the second machine learning model, a third predicted trajectory for the first object and a fourth predicted trajectory for the second object; and determining the interaction data based at least in part on a difference between the output of the machine learning model and the output of the second machine learning model.

J. The method of paragraph I, wherein determining the loss value comprises: increasing a prediction loss value associated with the machine learning model, based at least in part on determining that the difference is less than a difference threshold.

K. The method of paragraph F, further comprising: determining, based at least in part on the data, a first ground truth trajectory associated with the first object and a second ground truth trajectory associated with the second object; determining a first difference between the first ground truth trajectory and the first predicted trajectory, and a second difference between the second ground truth trajectory and the second predicted trajectory; determining a second loss value based at least in part on the first difference and the second difference; and training the machine learning model based at least in part on the loss value and the second loss value, to determine the trained machine learning model.

L. The method of paragraph F, wherein determining the loss value comprises: determining a driving context variable, based at least in part on at least one of: an object density of the environment; a location of the environment; a velocity of the first object in the environment; or a velocity of the second object in the environment; and weighting the loss value based at least in part on the driving context variable.

M. The method of paragraph F, wherein controlling the operation of the vehicle comprises: transmitting the trained machine learning model to a computing device associated with the vehicle, wherein the operation of the vehicle is based at least in part on executing the trained machine learning model.

N. One or more non transitory computer readable media storing instructions executable by a processor, wherein the instructions, when executed, cause the processor to perform operations comprising: receiving data representing an environment at a first time, the environment including a first object and a second object; providing at least a portion of the data as a first input to a machine learning model; determining, based at least in part on an output of the machine learning model, a first predicted trajectory for the first object and a second predicted trajectory for the second object; determining, based at least in part on the first predicted trajectory and the second predicted trajectory, interaction data associated with a predicted interaction between the first object and the second object; determining a loss value based at least in part on the interaction data; training the machine learning model based at least in part on the loss value, to determine a trained machine learning model; and controlling operation of a vehicle, based at least in part on the trained machine learning model.

O. The one or more non transitory computer readable media of paragraph N, wherein determining the interaction data comprises: providing a second input to a classification model, wherein the second input is based at least in part on the first predicted trajectory and the second predicted trajectory; and determining the interaction data based at least in part on an output of the classification model.

P. The one or more non transitory computer readable media of paragraph O, wherein determining the loss value comprises: increasing a prediction loss value associated with the machine learning model, based at least in part on the interaction data; and decreasing a classification loss value associated with the classification model, based at least in part on the interaction data.

Q. The one or more non transitory computer readable media of paragraph N, wherein determining the interaction data comprises: providing at least a portion of the data as a second input to a second machine learning model; determining, based at least in part on an output of the second machine learning model, a third predicted trajectory for the first object and a fourth predicted trajectory for the second object; and determining the interaction data based at least in part on a difference between the output of the machine learning model and the output of the second machine learning model.

R. The one or more non transitory computer readable media of paragraph Q, wherein determining the loss value comprises: increasing a prediction loss value associated with the machine learning model, based at least in part on determining that the difference is less than a difference threshold.

S. The one or more non transitory computer readable media of paragraph N, the operations further comprising: determining, based at least in part on the data, a first ground truth trajectory associated with the first object and a second ground truth trajectory associated with the second object; determining a first difference between the first ground truth trajectory and the first predicted trajectory, and a second difference between the second ground truth trajectory and the second predicted trajectory; determining a second loss value based at least in part on the first difference and the second difference; and training the machine learning model based at least in part on the loss value and the second loss value, to determine the trained machine learning model.

T. The one or more non transitory computer readable media of paragraph N, wherein determining the loss value comprises: determining a driving context variable, based at least in part on at least one of: an object density of the environment; a location of the environment; a velocity of the first object in the environment; or a velocity of the second object in the environment; and weighting the loss value based at least in part on the driving context variable.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more computer-readable media storing computer-executable instructions that, when executed, cause the one or more processors to perform operations comprising:

receiving data representing an environment, the data including a first trajectory associated with a first object in the environment and a second trajectory associated with a second object in the environment;

providing at least a portion of the data as a first input to a machine learning model, wherein the machine learning model is a joint prediction model configured to output a set of compatible trajectory predictions within the environment;

determining, based at least in part on a first output of the machine learning model associated with the first input, a first predicted trajectory for the first object and a second predicted trajectory for the second object;

determining a first loss value associated with the machine learning model, based at least in part on:

a first difference between the first trajectory and the first predicted trajectory; and a second difference between the second trajectory and the second predicted trajectory;

determining modified data representing the environment by modifying, in the data representing the environment, relative object data between the first object and the second object, wherein:

the modifying relative object data comprises at least one of masking interaction data representing an interaction between the first object and the second object, removing the interaction data, or down-weighting the interaction data, and wherein the interaction data subject to modification represents at least one of a relative position between the first object and the second object, a relative orientation between the first object and the second object, and a relative motion difference between the first object and the second object;

providing the modified data as a second input to a second machine learning model, and receiving a second output of the second machine learning model associated with the second input;

determining, based at least in part on a difference between the first output of the machine learning model and the second output of the second machine learning model being lower than a threshold value, a second loss value associated with the difference;

training the machine learning model based at least in part on the first loss value and the second loss value, to determine a trained machine learning model; and transmitting the trained machine learning model to a computing device associated with a vehicle, wherein operation of the vehicle is based at least in part on executing the trained machine learning model.

2. The system of claim 1, wherein the first output of the machine learning model comprises a first set of predicted trajectories including the first predicted trajectory and the second predicted trajectory, the operations further comprising: determining, based at least in part on the second output of the second machine learning model, a second set of predicted trajectories including a third predicted trajectory for the first object and a fourth predicted trajectory for the second object; and determining the second loss value based at least in part by comparing the first set of predicted trajectories to the second set of predicted trajectories.

3. The system of claim 2, wherein determining the second loss value comprises:

increasing a prediction loss value associated with the machine learning model, based at least in part on determining that a difference between the first set of predicted trajectories and the second set of predicted trajectories is less than a difference threshold.

4. A method comprising:

receiving data representing an environment at a first time, the environment including a first object and a second object;

providing at least a first portion of the data as a first input to a first machine learning model;

determining, based at least in part on an output of the first machine learning model, a first set of predicted trajectories including a first predicted trajectory for the first object and a second predicted trajectory for the second object;

determining modified data representing the environment by modifying, in the data representing the environment, relative object data between the first object and the second object, wherein the modifying relative object data comprises at least one of masking interaction data representing an interaction between the first object and the second object, removing the interaction data, or down-weighting the interaction data;

providing the modified data as a second input to a second machine learning model, wherein the second machine learning model is configured to modify interaction data representing an interaction between the first object and the second object;

determining, based at least in part on a second output of the second machine learning model, a second set of predicted trajectories including a third predicted trajectory for the first object and a fourth predicted trajectory for the second object;

determining a loss value based at least in part on a difference between the output of the first machine learning model and the second output of the second machine learning model, the difference being lower than a threshold value;

training the first machine learning model based at least in part on the loss value, to determine a trained machine learning model; and controlling operation of a vehicle, based at least in part on the trained machine learning model.

5. The method of claim 4, wherein determining the loss value comprises:

determining the loss value based at least in part by comparing the first set of predicted trajectories to the second set of predicted trajectories.

6. The method of claim 5, wherein determining the loss value comprises:

increasing a prediction loss value associated with the first machine learning model, based at least in part on determining that a difference between the first set of predicted trajectories and the second set of predicted trajectories is less than a difference threshold.

7. The method of claim 4, further comprising:

determining, based at least in part on the data, a first ground truth trajectory associated with the first object and a second ground truth trajectory associated with the second object;

determining a second difference between the first ground truth trajectory and the first predicted trajectory, and a third difference between the second ground truth trajectory and the second predicted trajectory;

determining a second loss value based at least in part on the second difference and the third difference; and training the first machine learning model based at least in part on the loss value and the second loss value, to determine the trained machine learning model.

8. The method of claim 4, wherein determining the loss value comprises:

determining a driving context variable, based at least in part on at least one of:

an object density of the environment;

a location of the environment;

a velocity of the first object in the environment; or a velocity of the second object in the environment; and weighting the loss value based at least in part on the driving context variable.

9. The method of claim 4, wherein controlling the operation of the vehicle comprises:

transmitting the trained machine learning model to a computing device associated with the vehicle, wherein the operation of the vehicle is based at least in part on executing the trained machine learning model.

10. One or more non-transitory computer-readable media storing instructions executable by a processor, wherein the instructions, when executed, cause the processor to perform operations comprising:

receiving data representing an environment at a first time, the environment including a first object and a second object;

providing at least a first portion of the data as a first input to a first machine learning model;

determining, based at least in part on an output of the first machine learning model, a first set of predicted trajectories including a first predicted trajectory for the first object and a second predicted trajectory for the second object;

determining modified data representing the environment by modifying, in the data representing the environment, relative object data between the first object and the second object, wherein:

the modifying relative object data comprises at least one of masking interaction data representing an interaction between the first object and the second object, removing the interaction data, or down-weighting the interaction data, and wherein the interaction data subject to modification represents at least one of a relative position between the first object and the second object, a relative orientation between the first object and the second object, or a relative motion difference between the first object and the second object;

providing the modified data as a second input to a second machine learning model, wherein the second machine learning model is configured to modify interaction data representing an interaction between the first object and the second object;

determining, based at least in part on a second output of the second machine learning model, a second set of predicted trajectories including a third predicted trajectory for the first object and a fourth predicted trajectory for the second object;

determining a loss value based at least in part on a difference between the output of the first machine learning model and the second output of the second machine learning model, the difference being lower than a threshold value;

training the first machine learning model based at least in part on the loss value, to determine a trained machine learning model; and controlling operation of a vehicle, based at least in part on the trained machine learning model.

11. The one or more non-transitory computer-readable media of claim 10, wherein determining the loss value comprises:

determining the loss value based at least in part by comparing the first set of predicted trajectories to the second set of predicted trajectories.

12. The one or more non-transitory computer-readable media of claim 11, wherein determining the loss value comprises:

increasing a prediction loss value associated with the first machine learning model, based at least in part on determining that a difference between the first set of predicted trajectories and the second set of predicted trajectories is less than a difference threshold.

13. The one or more non-transitory computer-readable media of claim 10, the operations further comprising:

determining, based at least in part on the data, a first ground truth trajectory associated with the first object and a second ground truth trajectory associated with the second object;

determining a second difference between the first ground truth trajectory and the first predicted trajectory, and a third difference between the second ground truth trajectory and the second predicted trajectory;

determining a second loss value based at least in part on the second difference and the third difference; and training the first machine learning model based at least in part on the loss value and the second loss value, to determine the trained machine learning model.

14. The one or more non-transitory computer-readable media of claim 10, wherein determining the loss value comprises:

determining a driving context variable, based at least in part on at least one of:

an object density of the environment;

a location of the environment;

a velocity of the first object in the environment; or a velocity of the second object in the environment; and weighting the loss value based at least in part on the driving context variable.

15. The method of claim 4, wherein:

the second machine learning model is identical to the first machine learning model; and providing the second input to the second machine learning model comprises:

determining modified data representing the environment by modifying, in the data representing the environment, relative object data between the first object and the second object; and providing the modified data as the second input to the second machine learning model.

16. The method of claim 15, wherein:

the data representing the environment comprises graph neural network (GNN) representation of the environment; and determining the modified data comprises modifying or removing, within the GNN representation, an edge feature representing a relative state difference between the first object and the second object.

17. The method of claim 4, wherein:

the first machine learning model is a first predictive model configured to output the first set of predicted trajectories, based at least in part on an indication within the data representing the environment of a potential interaction between the first object and the second object; and the second machine learning model is a second predictive model configured to output the second set of predicted trajectories, based at least in part on masking out the indication of the potential interaction between the first object and the second object.

18. The one or more non-transitory computer-readable media of claim 10, wherein:

the second machine learning model is identical to the first machine learning model; and providing the second input to the second machine learning model comprises:

determining modified data representing the environment by modifying, in the data representing the environment, relative object data between the first object and the second object; and providing the modified data as the second input to the second machine learning model.

19. The system of claim 1, wherein the second loss value is a divergent loss value and is increased based at least in part on a magnitude associated with the difference decreasing.

20. The method of claim 17, wherein the trained machine learning model is, based at least in part on using the loss value, associated with an increased responsiveness to the potential interaction compared to the first machine learning model.

* * * * *